United States Patent
Nishimura

(10) Patent No.: US 9,595,107 B2
(45) Date of Patent: Mar. 14, 2017

(54) DISTANCE MEASUREMENT APPARATUS AND DISTANCE MEASUREMENT METHOD

(71) Applicant: SOCIONEXT INC., Yokohama, Kanagawa (JP)

(72) Inventor: Satoshi Nishimura, Taito (JP)

(73) Assignee: SOCIONEXT INC., Yokohama (JP)

( * ) Notice: Subject to any disclaimer, the term of this patent is extended or adjusted under 35 U.S.C. 154(b) by 70 days.

(21) Appl. No.: 14/069,064

(22) Filed: Oct. 31, 2013

(65) Prior Publication Data

US 2014/0169635 A1    Jun. 19, 2014

(30) Foreign Application Priority Data

Dec. 19, 2012   (JP) .................................. 2012-277015

(51) Int. Cl.
*G06T 7/00* (2006.01)
*G01B 11/02* (2006.01)

(52) U.S. Cl.
CPC ............ *G06T 7/004* (2013.01); *G01B 11/026* (2013.01); *G06T 7/0057* (2013.01)

(58) Field of Classification Search
None
See application file for complete search history.

(56) References Cited

U.S. PATENT DOCUMENTS

| 5,448,359 A | * | 9/1995 | Schick | G01B 11/026 |
| | | | | 250/559.29 |
| 5,509,090 A | * | 4/1996 | Maruyama | G01B 11/2527 |
| | | | | 382/154 |
| 5,844,866 A | * | 12/1998 | Fujimoto | G11B 19/02 |
| | | | | 369/53.14 |
| 6,055,256 A | * | 4/2000 | Nakatsuka | B41J 2/45 |
| | | | | 372/46.01 |

(Continued)

FOREIGN PATENT DOCUMENTS

JP  2000-241131 A  9/2000
JP  2000-283739 A  10/2000

(Continued)

OTHER PUBLICATIONS

Akedo et al., "High-precision detection method for the reference position in an optical encoder," Applied Optics, vol. 32, No. 13, May 1, 1993.*

(Continued)

*Primary Examiner* — Matthew Bella
*Assistant Examiner* — Soo Shin
(74) *Attorney, Agent, or Firm* — Arent Fox LLP

(57) ABSTRACT

A distance measurement apparatus which outputs a plurality of spot beams in a grid-like pattern from a laser device to a target object and measures a distance to the target object based on image data of the plurality of spot beams, the apparatus includes a distance measurement unit configured to obtain the distance to the target object based on positions (Continued)

of the plurality of spot beams in the image data; and a control unit configured to perform, based on the image data, when a size of each of the spot beams is larger than a reference size, either one or both of a first control operation of reducing a diameter of laser light output from the laser device and a second control operation of increasing a shutter speed of an image sensing device which generates the image data.

12 Claims, 18 Drawing Sheets

(56) References Cited

U.S. PATENT DOCUMENTS

| | | | |
|---|---|---|---|
| 6,791,755 B2* | 9/2004 | Hatano | G02B 27/4272 |
| | | | 359/565 |
| 6,876,392 B1 | 4/2005 | Uomori et al. | |
| 2001/0017696 A1* | 8/2001 | Narita | G01B 11/026 |
| | | | 356/499 |
| 2004/0082874 A1 | 4/2004 | Aoki et al. | |
| 2004/0190005 A1* | 9/2004 | Doucet | G01B 11/24 |
| | | | 356/614 |
| 2005/0259266 A1* | 11/2005 | Seko | G01B 11/02 |
| | | | 356/498 |
| 2006/0180750 A1* | 8/2006 | Gollier | G01N 21/7743 |
| | | | 250/227.11 |
| 2006/0279428 A1 | 12/2006 | Sato et al. | |
| 2010/0060551 A1* | 3/2010 | Sugiyama | G02B 27/0172 |
| | | | 345/8 |
| 2010/0127185 A1* | 5/2010 | Fragner | B82Y 10/00 |
| | | | 250/398 |
| 2010/0225926 A1* | 9/2010 | van Amstel | G01B 11/2441 |
| | | | 356/511 |
| 2012/0050713 A1* | 3/2012 | Inoue | G01C 3/10 |
| | | | 356/3.11 |
| 2012/0105855 A1 | 5/2012 | Miyasaka et al. | |

FOREIGN PATENT DOCUMENTS

| | | |
|---|---|---|
| JP | 2002-122417 A | 4/2002 |
| JP | 2002-175582 A | 6/2002 |
| JP | 2005-003366 A | 1/2005 |
| JP | 2005-245974 A | 9/2005 |
| JP | 2012-098548 A | 5/2012 |

OTHER PUBLICATIONS

Japanese Office Action of related Japanese Patent Application No. 2012-277015 dated Jul. 12, 2016.

* cited by examiner

| NAME | NUMBER OF BITS | CONTENT | CONTROL | |
|---|---|---|---|---|
| S | 1 | Start Bit | 1 | |
| ADD | 8 | INFORMATION STORAGE ADDRESS | 0×55 | |
| Reno | 8 | CONTENT OF CONTROL OF IMAGE SENSING DEVICE | 0×80(CONTROL OF SHUTTER SPEED) | |
| DATA | 16 | data | 1/XXX SECONDS (1/1000 SECONDS WHEN DATA VALUE = 1000) | |
| E | 1 | End Bit | 1 | |

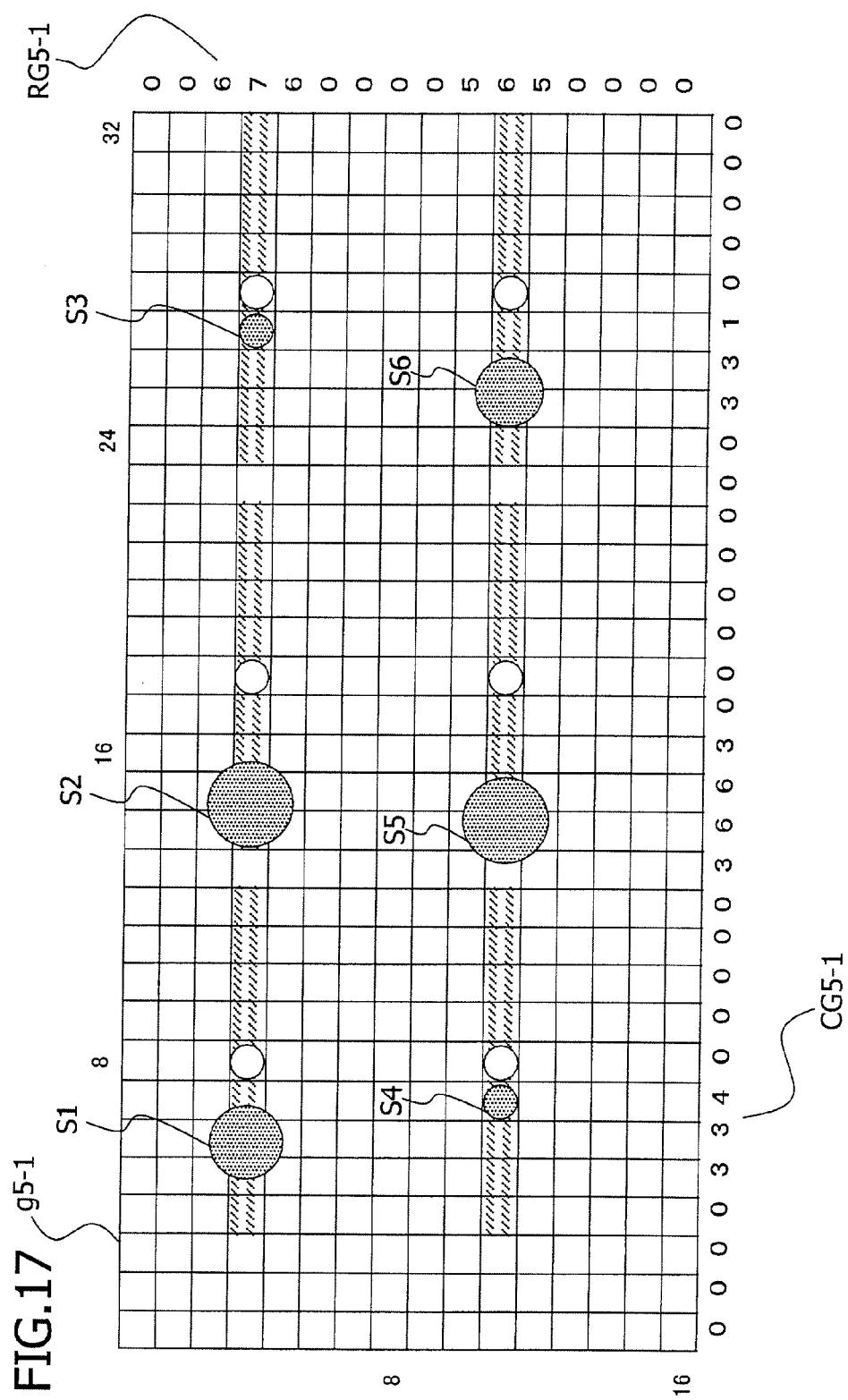

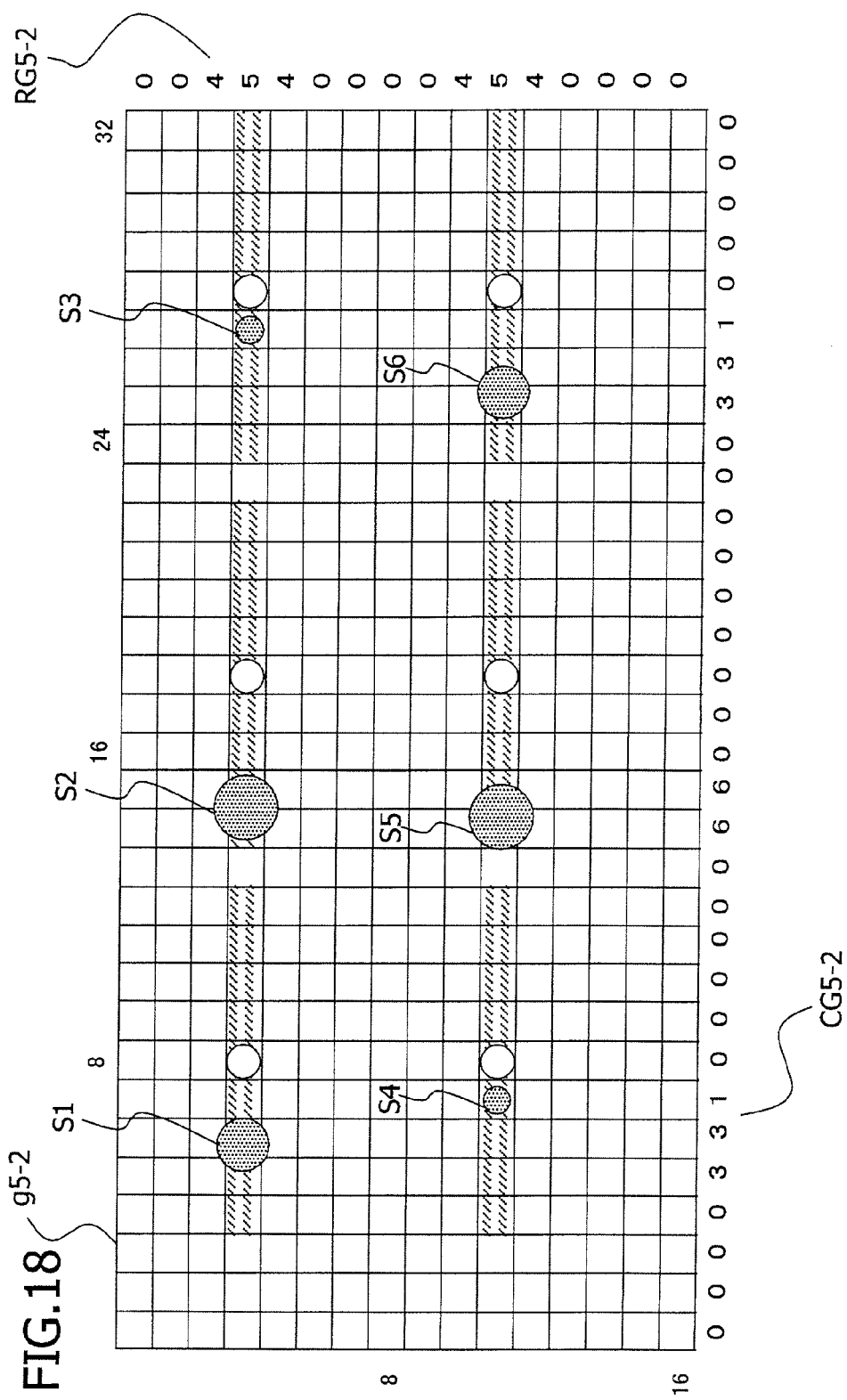

DISTANCE MEASUREMENT APPARATUS AND DISTANCE MEASUREMENT METHOD

CROSS-REFERENCE TO RELATED APPLICATION

This application is based upon and claims the benefit of priority of the prior Japanese Patent Application No. 2012-277015, filed on Dec. 19, 2012, the entire contents of which are incorporated herein by reference.

FIELD

The embodiment discussed herein is relates to a distance measurement apparatus and a distance measurement method.

BACKGROUND

In recent years, in the field of image recognition, processing has been performed in which the distance between a target object and a camera in a three-dimensional space is measured and information about the distance is used for image recognition processing. For the processing, e.g., a method based on a stereo camera configuration, a method based on Time of Flight (TOF), or the like is used.

In the method based on the stereo camera configuration, for example, the distance to a target object is measured using a triangulation method or the like based on image data from two cameras. In accordance with the method, every time the distance is measured, the image data from the two cameras needs to be processed, which may result in a lower processing speed. On the other hand, in the method based on TOF, laser light output from a light source is reflected by a target object and the distance to the target object is obtained based on the time of travel (delay time) of the light till the light reaches a sensor and the speed of the light. In accordance with the method, since one point is irradiated with the laser light, only the distance to a given one point at the target object can be measured. Note that, by swinging the laser light, the distance to a plane at the target object can be measured but, since the measurement is not performed by observation at a single time, the method is not suitable for the measurement of the distance to a moving target object.

Accordingly, for example, a diffraction grating is provided at the leading end of the laser light and pattern light having a plurality of spot beams is projected on a target object so that, based on the amount of movement of each of the spot beams from a reference position, the distance to a plane at the target object is measured (e.g., Japanese Patent Application Publication No. 2002-175582). For example, the position of the spot beam in image data when the target object is away from a laser light output unit by a predetermined reference distance is assumed to be the reference position. For example, at this time, when the target object is located at a distance longer than the reference distance, the position of the spot beam in the image data is located rightward of the reference position. For example, on the other hand, when the target object is located at a distance shorter than the reference distance, the position of the spot beam in the image data is located leftward of the reference position. Thus, in accordance with the distance to the target object, the position of the spot beam in the image data moves. Based on the amount of the movement thereof, the distance to the target object is calculated.

SUMMARY

When the distance between the laser light output unit and the target object is short, the amount of the spot beam in the image data increases. Due to the increased amount of the spot beam, in the image data, e.g., a blur occurs in the spot beam to increase the size of the spot beam and reduce the distance between the spot beam and the adjacent spot beam. This undesirably reduces the amount of movement of the spot beam from the reference position which can be measured, i.e., narrows a distance measurement range. Thus, when the distance between the laser output unit and the target object is short, the distance measurement range is narrow and the distance to the target object may be unable to be properly measured.

According to a first aspect of the embodiment, a distance measurement apparatus which outputs a plurality of spot beams in a grid-like pattern from a laser device to a target object and measures a distance to the target object based on image data of the plurality of spot beams, the apparatus includes a distance measurement unit configured to obtain the distance to the target object based on positions of the plurality of spot beams in the image data; and a control unit configured to perform, based on the image data, when a size of each of the spot beams is larger than a reference size, either one or both of a first control operation of reducing a diameter of laser light output from the laser device and a second control operation of increasing a shutter speed of an image sensing device which generates the image data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 17 is a view illustrating image data g5-1, a row-direction graph RG5-1, and a column-direction graph CG5-1 in the fifth specific example.

FIG. 18 is a view illustrating image data g5-2, a row-direction graph RG5-2, and a column-direction graph CG5-2 when the diameter of the output laser light or the shutter speed is controlled based on the image data g5-1 of FIG. 17 in the fifth specific example.

DESCRIPTION OF EMBODIMENTS

An embodiment of the present invention will be described below with reference to the drawings. It is to be noted that the technical scope of the present invention is not limited to the embodiment, and includes matters described in the claims and their equivalents.

(Configuration of Distance Measurement Apparatus)

Figure 1:
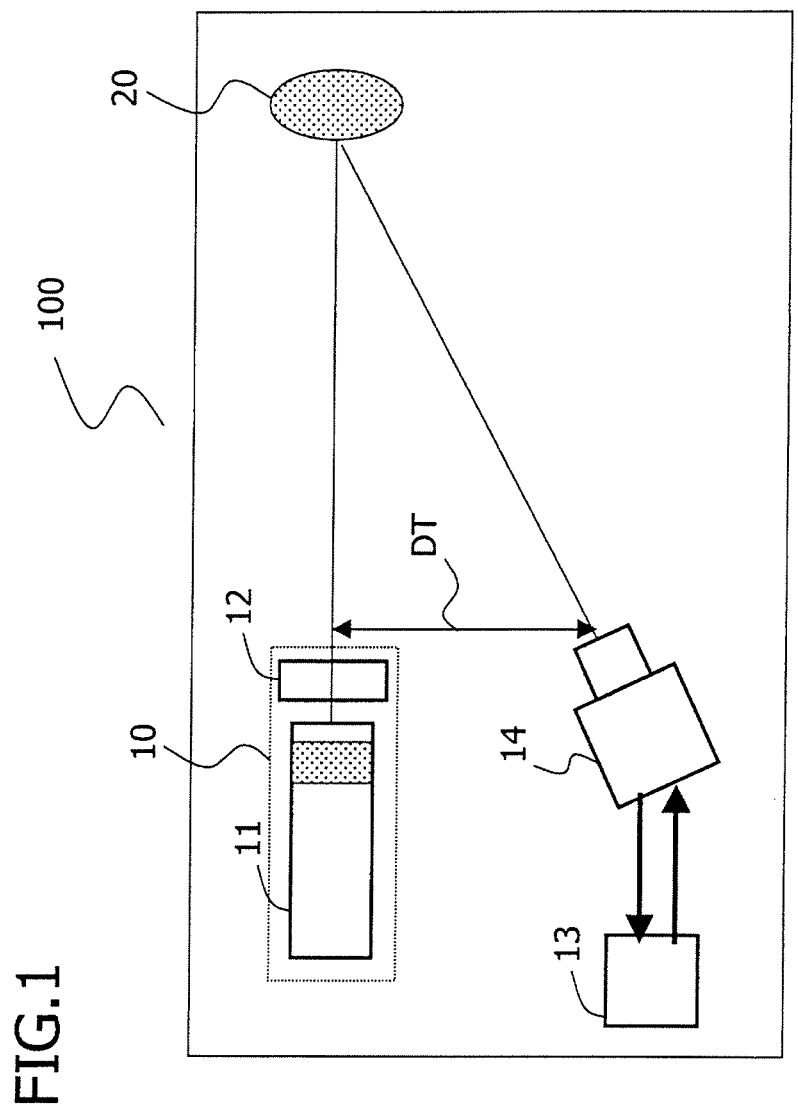
FIG. 1 is a view illustrating an example of a configuration of a distance measurement apparatus 100 in the present example embodiment.

FIG. 1 is a view illustrating an example of a configuration of a distance measurement apparatus 100 in the present example embodiment. The distance measurement apparatus 100 in the drawing has, e.g., a laser 11, a diffraction grating 12, an image sensing device 14, and a control device 13. On the front part of the laser 11, the diffraction grating 12 is mounted (hereinafter referred to as a laser unit 10) and, from the laser unit 10, laser light is emitted to irradiate a target object 20. On the front part of the image sensing device 14, a visible light cut filter is mounted. The image sensing device 14 generates image data for the target object 20 irradiated with the laser light and transmits the image data to the control device 13. Due to the visible light cut filter, the image data generated by the image sensing device 14 has an image of only spot beams projected by the irradiation with the laser light. That is, the image data has only brightness information. The control device 13 measures the distance to the target object 20 based on the image data, and also outputs an instruction to control the diameter of the output laser light to the laser unit 10 and an instruction to control a shutter speed to the image sensing device 14 as needed.

Figure 2:
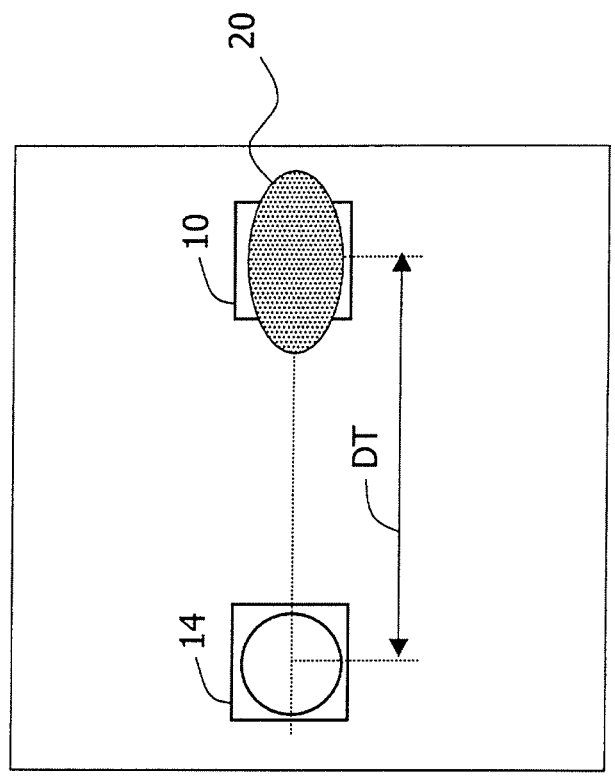
FIG. 2 illustrates a view in which the distance measurement apparatus 100 in the present example embodiment is viewed from the direction in which the laser light is projected.

FIG. 2 illustrates a view in which the distance measurement apparatus 100 in the present example embodiment is viewed from the direction in which the laser light is projected. As in the drawing, the image sensing device 14 is disposed at a distance DT from the laser unit 10. The laser unit 10 is disposed together with the target object 20 on a straight line so as to direct the laser light to the target object 20. Consequently, the image sensing device 14 senses an image of the target object 20 from an oblique direction. The laser unit 10 and the image sensing device 14 are disposed at the same height. As a result, in the present example embodiment, the position of each of the spot beams in image data generated by the image sensing device 14 moves in a lateral direction in the image data in accordance with the distance between the laser unit 10 and the target object 20. The details thereof will be described later using another view.

(Block Diagram of Distance Measurement Apparatus 100)

Figure 3:
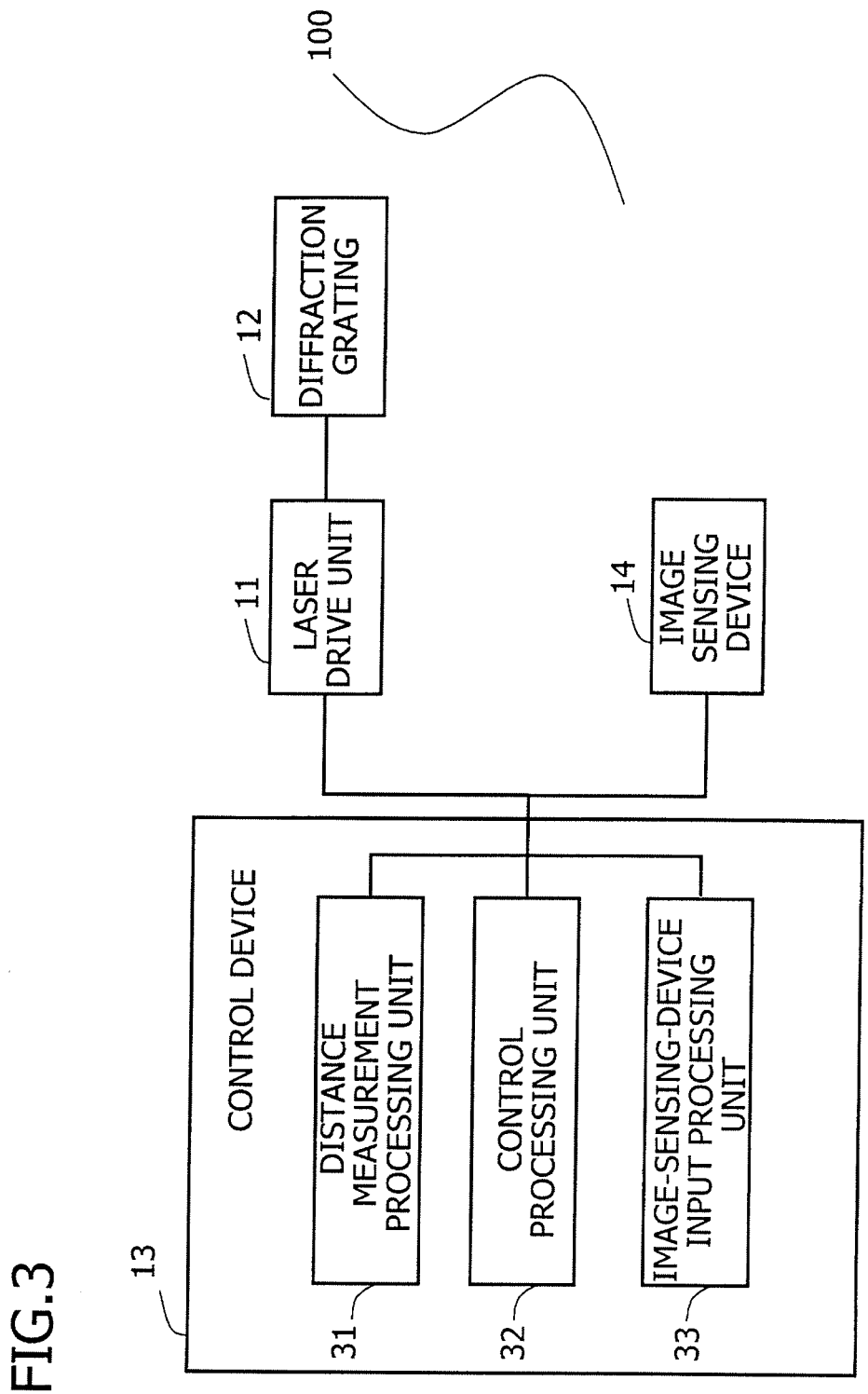
FIG. 3 is an exemplary view illustrating a block diagram of the distance measurement apparatus 100 in the present example embodiment.

FIG. 3 is an exemplary view illustrating a block diagram of the distance measurement apparatus 100 in the present example embodiment. In the drawing, the distance measurement apparatus 100 has, e.g., a laser drive unit 11, the diffraction grating 12, the image sensing device 14, and the control device 13. The laser drive unit 11 corresponds to the laser 11 of FIG. 1, and the diffraction grating 12 corresponds to the diffraction grating 12 of FIG. 1. The image sensing device 14 corresponds to the image sensing device 14 and the visible light cut filter in FIG. 1.

The control device 13 of FIG. 3 corresponds to the control device 13 of FIG. 1 and has, e.g., an image-sensing-device input processing unit 33, a distance measurement processing unit 31, and a control processing unit 32. The image-sensing-device input processing unit 33 stores the image data from the image sensing device 14, and the distance measurement processing unit 31 measures the distance to the target object 20 based on the image data. The control processing unit 32 determines the presence or absence of the need to control the diameter of the output laser light or control the shutter speed based on the image data. When it is determined that the control is needed, the control processing unit 32 gives an instruction to control the diameter of the output laser light to the laser unit 10 or an instruction to control the shutter speed to the image sensing device 14.

(Movement and Size of Spot Beam)

Figure 4:
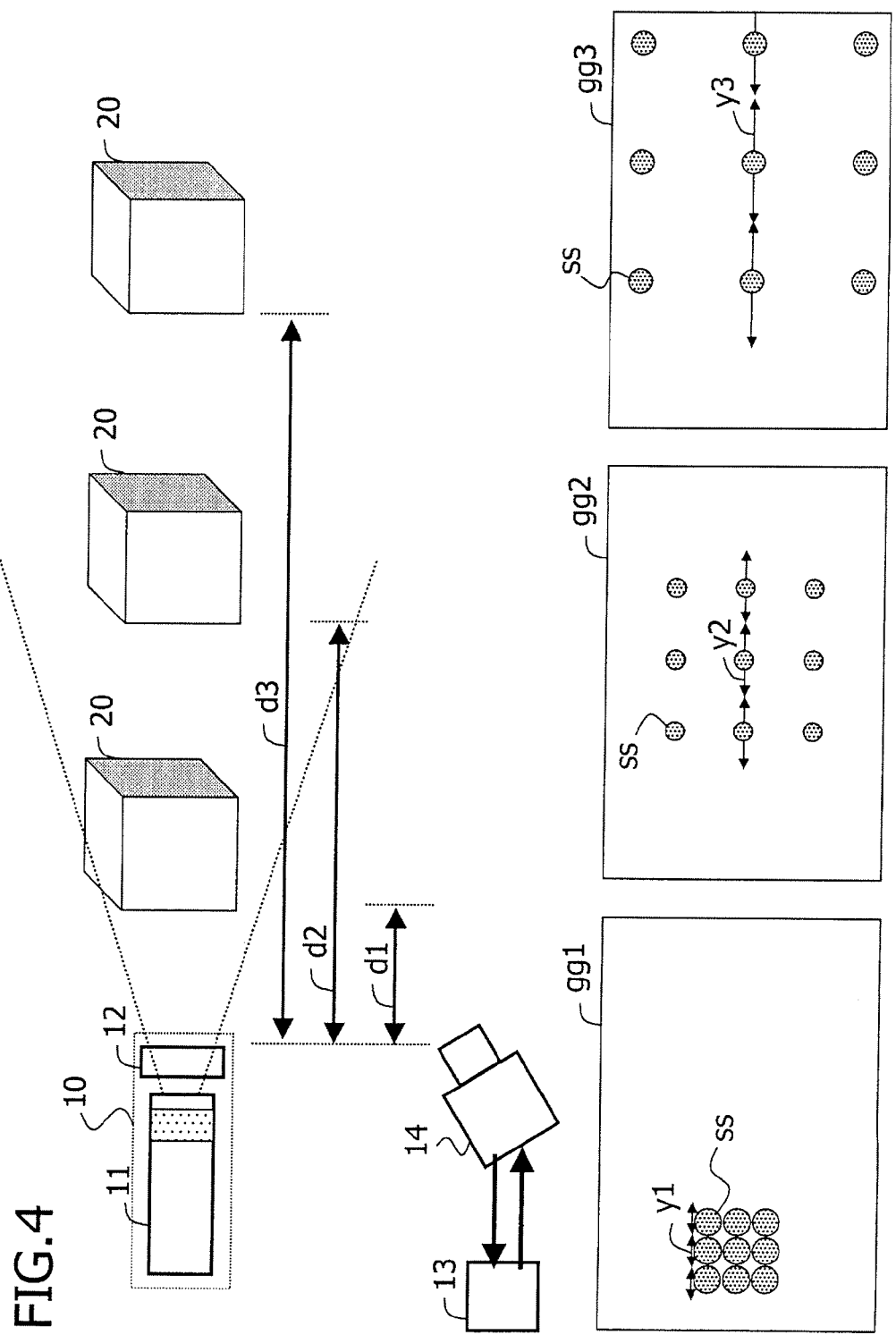
FIG. 4 is a view illustrating an example of the size and position of each of spot beams ss in three image data items gg1 to gg3 in which the distance between the laser unit 10 and the target object 20 differs.

FIG. 4 is a view illustrating an example of the size and position of each of spot beams ss in three image data items gg1 to gg3 in which the distance between the laser unit 10 and the target object 20 differs. In the example of the drawing, as described above using FIG. 1 and FIG. 2, the image sensing device 14 is disposed on the right side of the laser unit 10 to be parallel therewith. Accordingly, the position of the spot beam ss in the image data items gg1 to gg3 varies in the lateral direction in the image data in accordance with the distance between the laser unit 10 and the target object 20. More specifically, the position of the spot beam ss moves leftward as the target object 20 is closer to the laser unit 10 and moves rightward as the target object 20 is farther away from the laser unit 10. In accordance with the distance between the laser unit 10 and the target object 20, the size of the spot beam in the image data also varies. Based on the image data items gg1 to gg3, a specific description will be given.

The image data item gg2 of FIG. 4 illustrates an example of the image data when the distance between the laser unit 10 and the target object 20 is a reference distance d2. The reference distance indicates a distance to about a midpoint of a distance to be measured. When the distance between the laser unit 10 and the target object 20 is the reference distance d2, the spot beam ss is located in, e.g., the middle portion of the image data item gg2 and has a given space between the spot beam ss and each of the adjacent spot beams. An arrow y2 of the drawing indicates a range in which the amount of movement of the spot beam can be measured, i.e., a distance measurement range. Specifically, the arrow y2 indicates the distance to a midpoint in the space between the adjacent spot beams. When the distance measurement range of the spot beam ss is narrow, the spot beam ss is fused together with the adjacent spot beam and the amount of movement may be unable to be measured. However, in the image data item gg2, the individual spot beams have a sufficient space therebetween so that the fusing together of the adjacent spot beams or an overlap of the adjacent spot beams is unlikely to occur.

The image data item gg1 of FIG. 4 illustrates an example of the image data when the distance between the laser unit 10 and the target object 20 is a distance d1 shorter than the reference distance d2. When the distance between the laser unit 10 and the target object 20 is shorter than the reference distance d2, the spot beam ss is located in the left portion of the image data item gg1 and the space between the individual spot beams is reduced in the image data item gg1. Also, at this time, the amount of light of the spot beam ss increases to cause the phenomenon of a blur in the spot beam in the image data item gg1. The phenomenon of a blur increases the size of each of the spot beams ss in the image data item gg1. That is, when the distance between the laser unit 10 and the target object 20 is short, the space between the individual spot beams ss in the image data item gg1 is narrow and also the size of each of the spot beams ss increases. Accordingly, a distance measurement range y1 in the image data item gg1 is narrow. In such a case, the fusing together of the adjacent spot beams or an overlap of the adjacent spot beams is likely to occur in the image data item gg1 and the amount of movement of the spot beam ss may be unable to be measured.

On the other hand, the image data item gg3 of FIG. 4 illustrates an example of the image data when the distance between the laser unit 10 and the target object 20 is a distance d3 longer than the reference distance d2. When the distance between the laser unit 10 and the target object 20 is longer than the reference distance d2, the spot beam ss is located in the right portion of the image data item gg3 and the space between the individual spot beams in the image data item gg3 is increased. Also, in this case, since the distance between the laser unit 10 and the target object 20 is long, the size of each of the spot beams ss relatively increases, but the amount of the spot beam does not increase. As a result, the phenomenon of a blur in the spot beam does not occur. Accordingly, a distance measurement range y3 in the image data item gg3 is sufficient.

Thus, in accordance with the distance between the laser unit 10 and the target object 20, the size and position of each of the spot beams ss in the image data vary so that the distance measurement range also differs. When the distance between the laser unit 10 and the target object 20 is short, the distance measurement range y2 is narrowed and the distance to the target object 20 may be unable to be measured. Therefore, when the distance between the laser unit 10 and the target object 20 is short, to increase the distance measurement range y2, the size of the spot beam is preferably minimized. When the distance between the laser unit 10 and the target object 20 is short and the target object 20 is a person or the like, the laser light in the large amount is harmful to the person. Accordingly, the amount of light is also preferably minimized.

The distance measurement apparatus 100 in the present example embodiment obtains the distance to the target object based on the positions of the plurality of spot beams in the image data. When the size of each of the spot beams is larger than a reference size, based on the image data, the distance measurement apparatus 100 performs either one or both of a first control operation of reducing the diameter of the laser light output from the laser unit 10 and a second control operation of increasing the shutter speed of the image sensing device 14 that has generated the image data. This allows the distance measurement apparatus 100 to preliminarily detect an increase in the size of the spot beam in the image data based on the image data. Then, the distance measurement apparatus 100 adjusts the shutter speed of the image sensing device 14 or the diameter of the output laser light based on the detection to be able to reduce the size of the spot beam in the image data and widen the distance measurement range.

Here, based on a flow chart, a description will be given sequentially of the flow of processing in the distance measurement apparatus 100 in the present example embodiment.

(Flow of Processing in Distance Measurement Apparatus 100)

Figure 5:
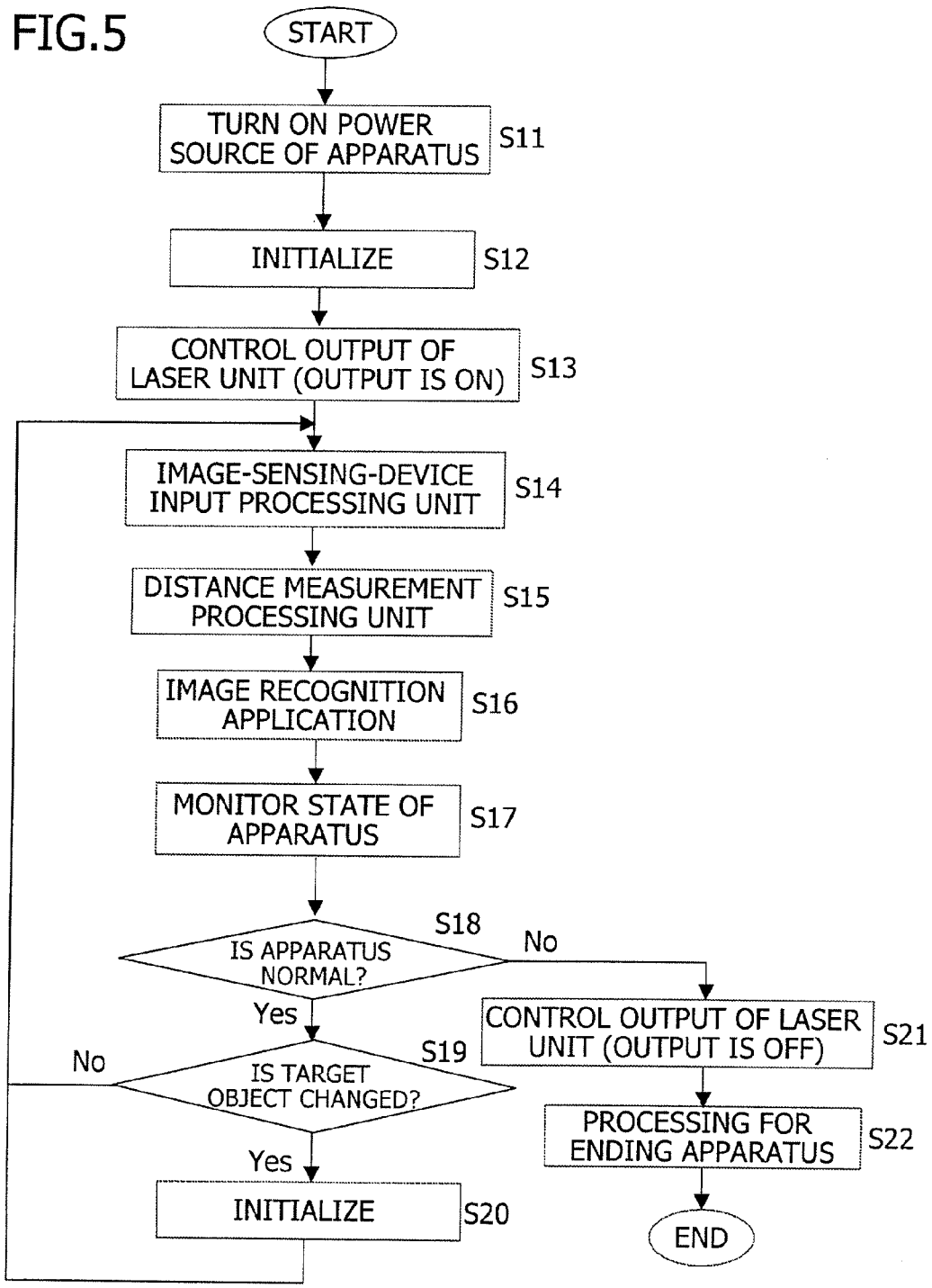
FIG. 5 is a flow chart diagram illustrating the processing in the distance measurement apparatus 100 in the present example embodiment.

FIG. 5 is a flow chart diagram illustrating the processing in the distance measurement apparatus 100 in the present example embodiment. First, when the power source of the distance measurement apparatus 100 is turned ON (S11), default values as initial values are set to the value of the diameter of the output laser light and the value of the shutter speed (S12). Subsequently, the output of the laser light from the laser unit 10 is controlled to be turned ON (S13). As a result, while a shutter is being pressed, the laser light is projected from the laser unit 10 in accordance with the shutter speed.

Subsequently, one frame of image data of the spot beams projected on the target object is generated by the image sensing device 14 and input to the image-sensing-device input processing unit 33 of the control device 13 (S14). Subsequently, the image data received by the image-sensing-device input processing unit 33 is input to the distance measurement processing unit 31 (S15). The distance measurement processing unit 31 calculates the distance to the target object based on the amount of movement of each of the spot beams in the image data and the distance between the laser unit 10 and the image sensing device 14 in accordance with the principle of a triangulation method. At this time, the distance measurement apparatus 100 in the present example embodiment detects the enlargement of the spot beam based on the image data and controls either or both of the values of the diameter of the output laser light and the shutter speed as needed. The details of the processing will be described later.

When the distance to the target object is thus measured, the measured distance is input to an image recognition application (S16). Specifically, the image recognition application performs predetermined image processing such as the processing, correction, or the like of the image data using the measured distance. Subsequently, the distance measurement apparatus 100 checks whether or not the distance measurement apparatus 100 is in a normal state (S18). When the distance measurement apparatus 100 is in the normal state (YES in S18), the distance measurement apparatus 100 determines whether or not the target object to be subjected to distance measurement is changed (S19). When an abnormal state such as temperature abnormality or the like is recognized in the distance measurement apparatus 100 (NO in S18), the output of the laser light from the laser unit 10 is controlled to be turned OFF (S21), and the processing in the distance measurement apparatus 100 is ended (S22).

When the target object to be subjected to distance measurement is not changed (YES in S19), i.e., when the target object is the same, the processing in the distance measurement apparatus 100 shifts to the image-sensing-device input processing unit 33 (S14), and an input of new image data is received. On the other hand, when the target object to be subjected to distance measurement is not the same (NO in S19) or when there is no target object, the values of the diameter of the output laser light and the shutter speed are set again to the default values as the initial values (S20). Then, in the same manner, the processing in the distance measurement apparatus 100 shifts to the image-sensing-device input processing unit 33 (S14) to result in a state where an input of image data corresponding to a new target object can be received.

(Detailed Flow of Distance Measurement Processing Unit 31)

Figure 6:
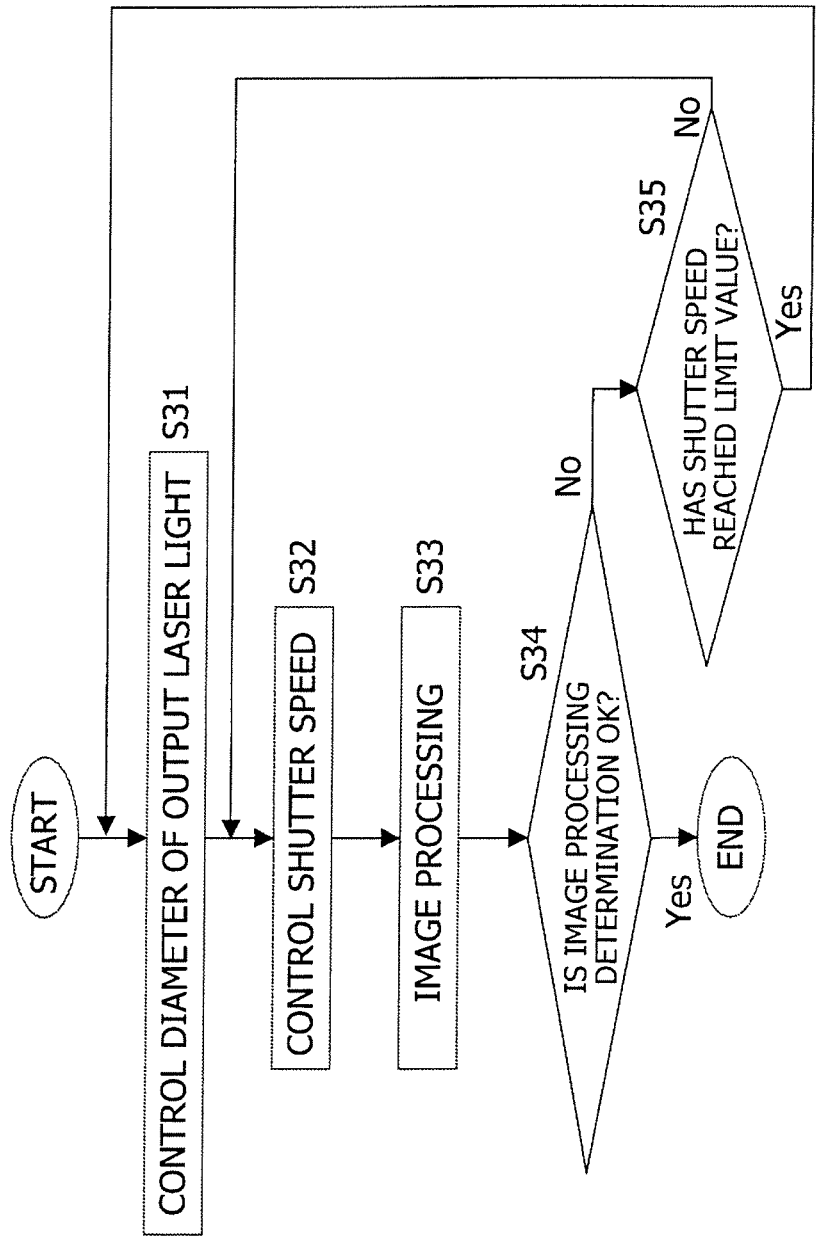
FIG. 6 is a flow chart diagram illustrating processing in the distance measurement processing unit 31 in the flow chart diagram of FIG. 5.

FIG. 6 is a flow chart diagram illustrating processing in the distance measurement processing unit 31 in the flow chart diagram of FIG. 5. First, based on set values, the values of the diameter of the output laser light and the shutter speed are controlled (S31 and S32). Subsequently, based on the input image data, image processing is performed (S33). In the image processing, the calculation of the distance to the target object based on the image data and the production of graphs based on the image data is performed. The details of the image processing will be described later.

Subsequently, based on the graphs produced in the image processing (S33), an image processing determination is made (S34). Specifically, in the image processing determination, based on the graphs corresponding to the image data, the size and position of each of the spot beams in the image data are determined (S34). When the image processing is determined to be normal (YES in S34), the control of the diameter of the output laser light or the shutter speed is not performed. On the other hand, when the image processing is determined to be abnormal (NO in S34), it is determined whether or not the shutter speed has reached a maximum speed (S35). When the shutter speed has not reached the maximum speed (NO in S35), the control processing unit 32 outputs control data indicating a one-level higher shutter speed to the image sensing device 14 to thereby control the shutter speed. On the other hand, when the shutter speed has already reached the maximum speed (YES in S35), the control processing unit 32 outputs control data indicating a one-level smaller diameter of the output laser light to the laser unit 10 to thereby control the diameter of the output laser light.

In this manner, when the size of each of the spot beams in the image data is large or when the spot beam is at a position which indicates a short distance outside a reference distance measurement processing range, the shutter speed or the diameter of the output laser light is controlled so as to reduce the amount of the spot beam in the image data. As a result of controlling the shutter speed to a higher speed, an exposure is reduced and the size of the spot beam in the image data is reduced. The projection of the laser light from the laser unit 10 is performed in accordance with the shutter speed. Accordingly, as a result of controlling the shutter speed to a higher speed, the projection time of the laser light is reduced and the amount of the laser light is also reduced. Also, as a result of adjusting the diameter of the output laser light to a smaller size, the amount of the laser light is reduced and the size of the spot beam in the image data is also reduced.

Here, a description will be given of an example of the control data output from the control processing unit 32 to the image sensing device 14 during the control of the shutter speed.

(Example of Control Data)

Figure 7:
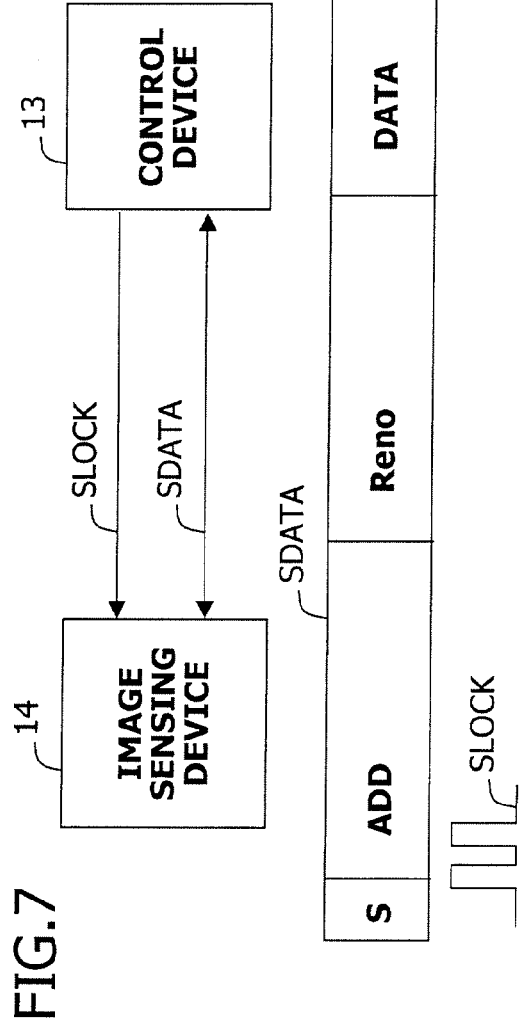
FIG. 7 is a view illustrating an example of control data SDATA for the shutter speed which is output by the control processing unit 32 from the control device 13 to the image sensing device 14.

FIG. 7 is a view illustrating an example of control data SDATA for the shutter speed which is output by the control processing unit 32 from the control device 13 to the image sensing device 14. In the present example embodiment, the control data is controlled via, e.g., a serial interface connecting the control processing unit 32 and the image sensing device 14. The image sensing device 14 retrieves the control data SDATA output from the control device 13 via the serial interface at the time when, e.g., a clock signal SLOCK is input. In the example of the drawing, the control data SDATA has, e.g., data S, data ADD, data Reno, data DATA, and data E.

Specifically, the data S indicates the start bit of the control data SDATA, and the data E indicates the end bit of the control data SDATA. Each of the data S and the data E is, e.g., a 1-bit value of 0x1. The data ADD indicates an information storage address which is the address of a transmission target, i.e., the address of the image sensing device 14. In this example, the data ADD is, e.g., a 8-bit value of 0x55. The data Reno is data indicating the content of control and is a 8-bit value of 0x80 indicating the control of the shutter speed. The data DATA is a 16-bit value of 0x1111101000 (decimal number 1000). In this example, the value of 0x1111101000 indicates a shutter speed of $\frac{1}{1000}$ seconds.

Based on such control data, the shutter speed of the image sensing device 14 is controlled. Note that, in processing for controlling the diameter of the output laser light also, the control data is output, e.g., from the control processing unit 32 or from the control processing unit 32 to the laser unit 10 via the image sensing device 14, though not illustrated in the example of FIG. 7. Note that the control data for controlling the diameter of the output laser light may also be output, e.g., from the control processing unit 32 to the laser unit 10 via the image sensing device 14. Subsequently, a description will be given of the image processing illustrated in the flow chart diagram of FIG. 6 based on the flow chart diagram.

(Detailed Flow of Image Processing)

Figure 8:
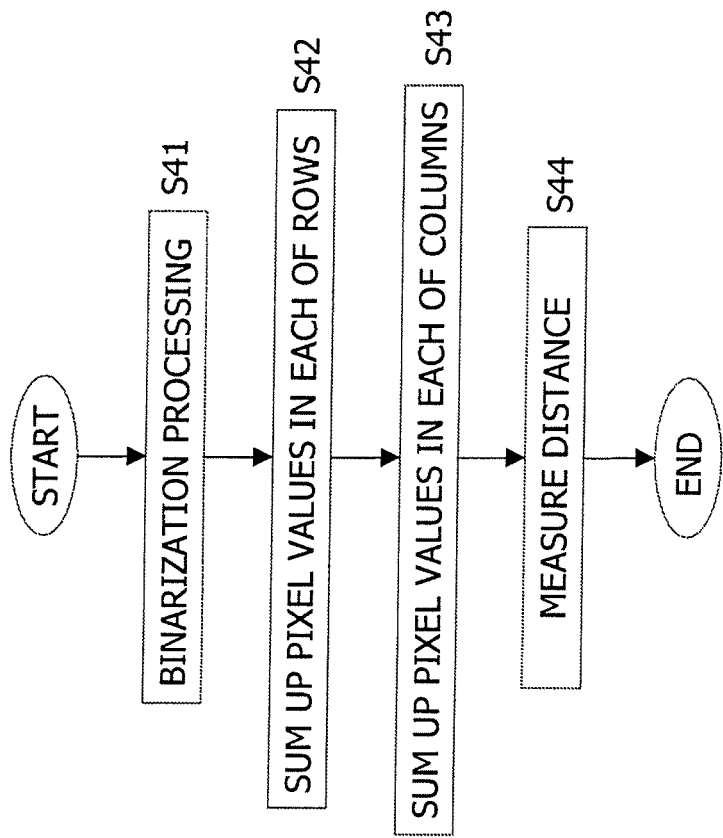
FIG. 8 is a flow chart diagram illustrating the flow of the image processing in the flow chart diagram of FIG. 6.

FIG. 8 is a flow chart diagram illustrating the flow of the image processing in the flow chart diagram of FIG. 6. First, the distance measurement processing unit 31 binarizes the image data input to the image-sensing-device input processing unit 33 to generate binarized data (S41). Specifically, the distance measurement processing unit 31 generates, for each of the pixels in the image data, binarized data having a value of 1 when a reference value is exceeded or having a value of 0 when the reference value is not exceeded. Thus, the binarized data is generated in which each of the pixels corresponding to the spot beams has the value of 1 and each of the pixels not corresponding to the spot beams has the value of 0. Subsequently, the distance measurement processing unit 31 sums up the values of the individual pixels forming each of rows in the binarized data on a per row basis to produce a row-direction graph (S42). Likewise, the distance measurement processing unit 31 sums up the values of the individual pixels forming each of columns in the binarized data on a per column basis to produce a column-direction graph (S43).

Subsequently, the distance measurement processing unit 31 calculates, based on the amount of movement of each of the spot beams from the reference position in the image data, the distance to the target object corresponding to the spot beam in accordance with the principle of the triangulation method. Thus, based on the image data, the distance to the target object is calculated. At this time, when the distance measurement range of each of the spot beams is narrow in the image data and fusion occurs between the adjacent spot beams, the distance measurement processing unit 31 is unable to measure the amount of movement of each of the spot beams and unable to calculate the distance to the target object. Accordingly, the control processing unit 32 in the present example embodiment makes an image processing determination based on the row-direction graph and the column-direction graph each produced based on the binarized data and performs a control operation to reduce the size of the spot beam in the image data as needed. Subsequently, a description will be given of processing for generating the graphs in correspondence to the pixels in the image data.

(Specific Example of Processing for Generating Graphs)

Figure 9:
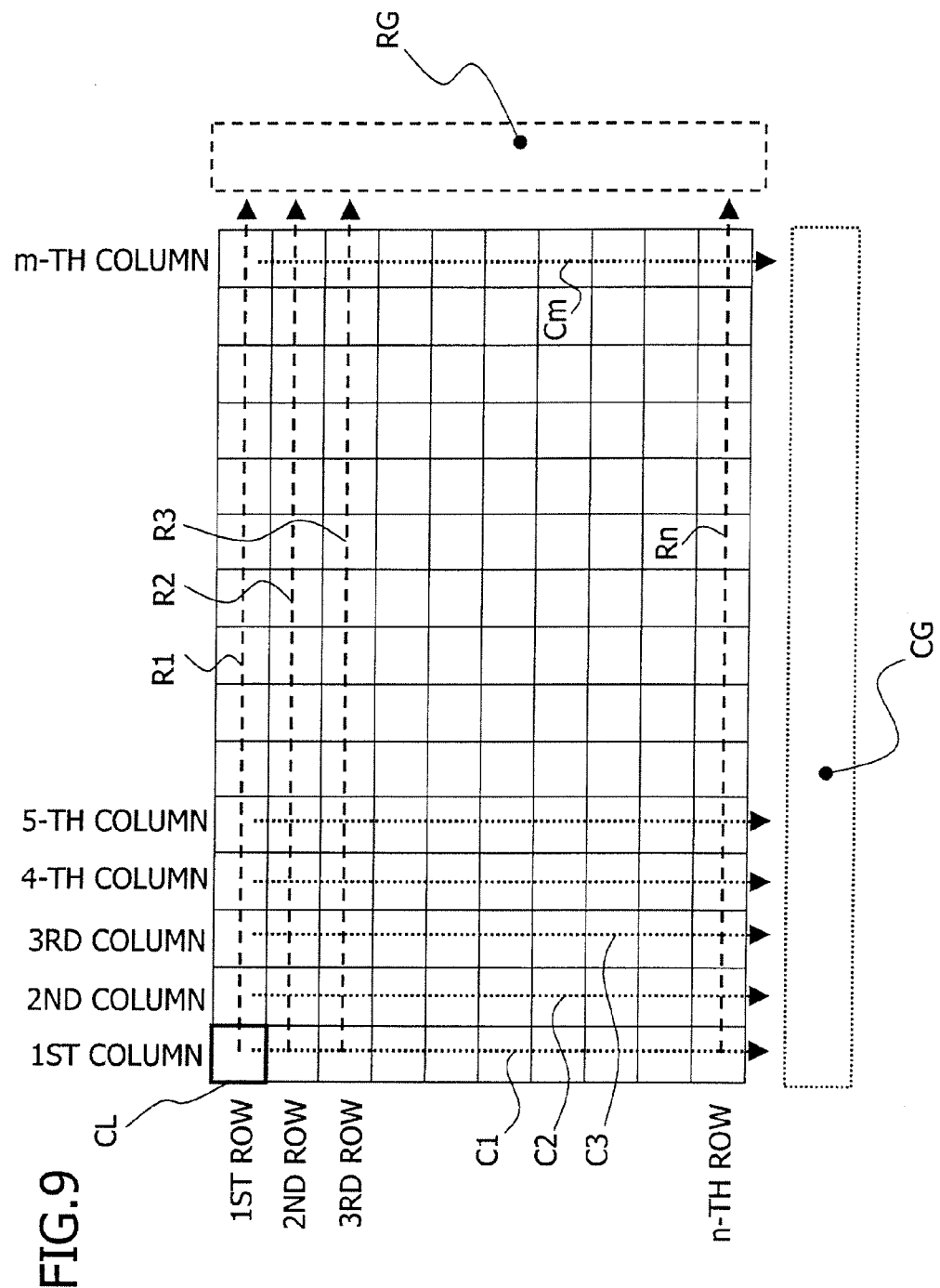
FIG. 9 is an illustrative view illustrating the processing for generating a row-direction graph RG and a column-direction graph CG.

FIG. 9 is an illustrative view illustrating the processing for generating a row-direction graph RG and a column-direction graph CG. In this example, broken-line arrows R1 to Rn represent the processing for generating the row-direction graph RG and dotted-line arrows C1 to Cm represent the processing for generating the column-direction graph CG. Also, each of frames CL in the image data of the drawing represents a pixel.

In the production of the row-direction graph RG, the control processing unit 32 sums up the values (each of which is 0 or 1) of all the pixels in a first row R1 in the binarized data. Subsequently, the control processing unit 32 sums up the values of all the pixels in a second row R2 in the binarized data. Likewise, the values of the pixels in each of the subsequent rows up to an n-th row Rn are summed up. The row-direction graph represents a set of the respective sums in the first to n-th rows R1 to Rn. Likewise, in the production of the column-direction graph CG, the control processing unit 32 sums up the binarized values of all the pixels in a first column C1. Likewise, the values of the pixels in each of the other columns up to an m-th column Cm are summed up. The column-direction graph CG represents a set of the respective sums in the first to m-th columns C1 to Cm.

Subsequently, a specific description will be given of the image processing determination based on the row-direction graph RG and the column-direction graph CG.

(Image Processing Determination)

As described above, each of the spot beams in the image data in the present example embodiment moves in the row direction (lateral direction) in the image data in accordance with the distance to the target object. By contrast, the spot beams in the image data do not move in the column direction in accordance with the distance to the target object. This indicates that the center position of the spot beam does not move in the column direction in the image data. Accordingly, based on the row-direction graph RG obtained by summing up the values in the row direction in the image data, the size of the spot beam in the image data can be easily determined. Also, based on the column-direction graph CG obtained by summing up the values in the column direction in the image data, a change in the position of the spot beam in the image data can be easily determined.

That is, based on first-direction data (which is the row-direction graph RG in the present example embodiment) obtained by summing up the values of the individual pixels in a first direction (which is the row direction in the present example embodiment) in the binarized data in which the position of the spot beam moves in accordance with a change in the distance to the target object, the distance measurement apparatus 100 in the present example embodiment determines whether or not the size of the spot beam is not larger than a reference size. Also, based on the position of the spot beam which is assumed based on second-direction data (which is the column-direction graph CG in the present example embodiment) obtained by summing up the values of the individual pixels in a second direction (which is the column direction in the present example embodiment) orthogonal to the first direction (which is the row direction in the present example embodiment), the distance measurement apparatus 100 determines whether or not the size of the spot beam is not larger than the reference size. The reference size indicates a size obtained by increasing, by a reference degree, the size of the spot beam in the image data (binarized data) based on which the distance has been previously obtained.

Note that, when the spot beam is at a position which indicates a short distance outside a reference distance measurement processing range in the first direction (which is the row direction in the present example embodiment) in which the position of the spot beam moves in accordance with a change in the distance to the target object, the distance measurement apparatus 100 in the present example embodiment determines that the position of the spot beam is abnormal based on the second-direction data (which is the column-direction graph CG in the present example embodiment). The reference distance measurement processing range indicates a range which is a distance to a midpoint in the space between the spot beam and the adjacent spot beam and does not overlap the reference distance measurement processing range of the adjacent spot beam.

Here, based on specific examples, the image processing determination in the present example embodiment will be sequentially described.

(First Specific Example)

Figure 10:
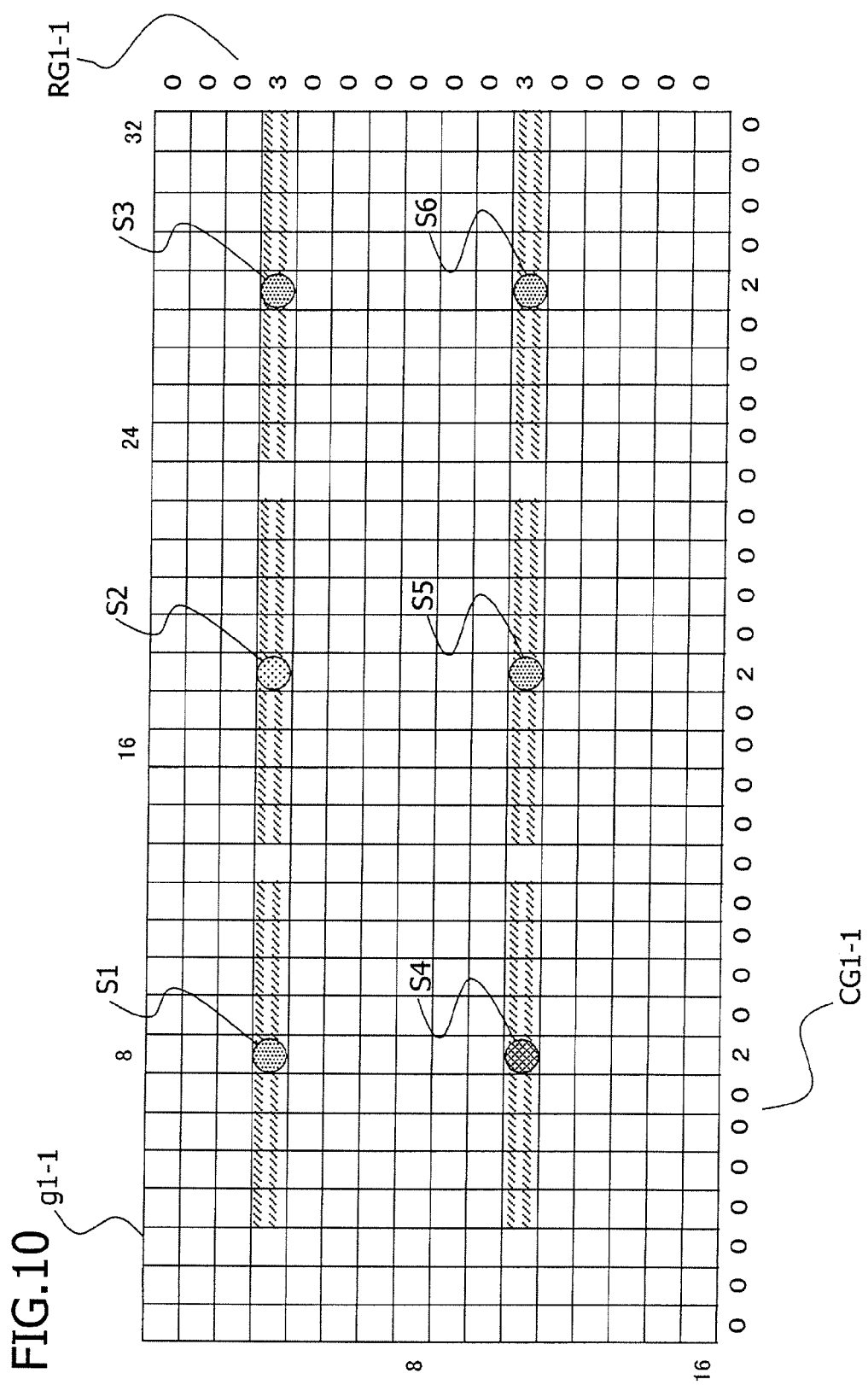
FIG. 10 is a view illustrating image data g1-1, a row-direction graph RG1-1, and a column-direction graph CG1-1 in the first specific example.

FIG. 10 is a view illustrating image data g1-1, a row-direction graph RG1-1, and a column-direction graph CG1-1 in the first specific example. The image data g1-1 in the drawing has six spot beams S1 to S6 projected on the target object. In the example of the drawing, the target object is located at the reference distance d2 illustrated in FIG. 4. The reference distance indicates a distance to about a midpoint in a distance range corresponding to the reference distance measurement processing range. Accordingly, in the row direction in the image data g1-1 in the example of the drawing, each of the spot beams 51 to S6 is located at the midpoint in the reference distance measurement processing range indicated by the oblique lines. The size of each of the spot beams S1 to S6 in the image data g1-1 in the drawing corresponds to one pixel.

Specifically, in the image data g1-1 of FIG. 10, the three spot beams (S1 to S3/S4-S6) each having a size of 1×1 are located in each of the fourth and eleventh rows. Accordingly, the row-direction graph RG1-1 based on the image data g1-1 has a value of 3 in correspondence to each of the fourth and eleventh rows, while having a value of 0 in correspondence to each of the other rows. Also, in the image data g1-1 of the drawing, the two spot beams are located in each of the eighth, eighteenth, and twenty-eighth columns. Accordingly, the column-direction graph CG1-1 based on the image data g1-1 has a value of 2 in correspondence to each of the eighth, eighteenth, and twenty-eighth columns, while having the value of 0 in correspondence to each of the other columns.

Then, based on the row-direction graph RG1-1, it is determined whether or not the size of each of the spot beams is not larger than the reference size. As described above, the position of each of the spot beams in the image data g1-1 in the present example embodiment moves in the row direction in accordance with the distance to the target object, but does not move in the column direction. That is, in the image data g1-1 of FIG. 10, the center positions of the spot beams do not move from the fourth and eleventh rows.

This means that, irrespective of the size of each of the spot beams S1 to S6, the centers of the spot beams are located in the fourth and eleventh rows. This allows the distance measurement apparatus 100 to assume the maximum size of each of the spot beams based on the values of the rows previous and subsequent to the fourth and eleventh rows in the row-direction graph RG1-1.

Specifically, in the row-direction graph RG1-1 of FIG. 10, each of the fourth and eleventh rows has the value of 3 and each of the rows (third and fifth rows/tenth and twelfth rows) previous and subsequent thereto has the value of 0. This allows the distance measurement apparatus 100 to assume that each of the three spot beams (S1 to S3/S4 to S6) has the size of 1×1 based on the row-direction graph RG1-1. In this example, it is assumed that each of the corresponding spot beams in the image data based on which the distance has been previously obtained has the size of 1×1 and the reference size is a size of 2×2. As a result, it is determined that the size of each of the spot beams S1 to S6 is not larger than the reference size of 2×2 and is normal.

The distance measurement apparatus 100 can also assume the position of each of the spot beams based on the column-direction graph CG1-1. In the column-direction graph CG1-1, the eighth, eighteenth, and twenty-eighth columns having values larger than the value of 0 are included in the reference distance measurement processing range corresponding to each of the spot beams (S1, S4/S2, S5/S3, S6). This allows the distance measurement apparatus 100 to determine that none of the spot beams in the image data g1-1 is at a position which indicates a short distance outside the reference distance measurement processing range and the position of each of the spot beams is normal based on the column-direction graph CG1-1. In addition, since none of the spot beams is at a position which indicates a short distance outside the reference distance measurement processing range, the distance measurement apparatus 100 can assume that the size of each of the spot beams is not larger than the reference size.

Thus, it is determined based on the image data g1-1 of FIG. 10 that the size of each of the spot beams in the image data g1-1 is not larger than the reference size and is normal. As a result, the distance measurement range is determined to be sufficient so that the control of the diameter of the output laser light or the shutter speed is not performed. It is also determined based on the image data g1-1 of FIG. 10 that none of the spot beams in the image data g-1 is at a position which indicates a short distance outside the reference distance measurement processing range and the position of each of the spot beams is normal. Accordingly, the amount of the laser light also need not be controlled so that the control of the diameter of the output laser light or the shutter speed is not performed. Thus, the distance measurement apparatus 100 in the present example embodiment makes an image processing determination based on the binarized data obtained by binarizing the image data g1-1 to allow the size and position of each of the spot beams in the image data g1-1 to be easily determined.

Here, a description will be given of the reference size. In the present example embodiment, the reference size is a size obtained by increasing, by a reference degree, the size of the corresponding spot beam in the image data (binarized data) based on which the distance has been previously obtained.

(Reference Size)

Figure 11:
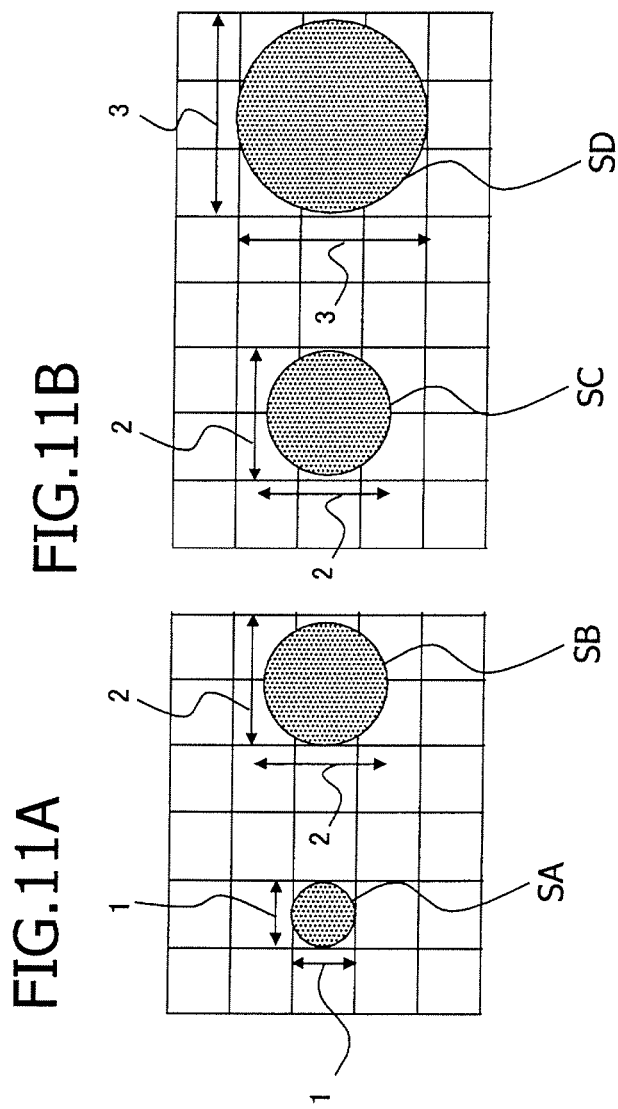
FIG. 11A and FIG. 11B are views each illustrating the reference size in the present example embodiment.

FIG. 11A and FIG. 11B are views each illustrating the reference size in the present example embodiment. In the example of the drawings, exemplary cases are illustrated where each of the spot beams in the image data (binarized data) based on which the distance has been previously obtained has the size of 1×1 (FIG. 11A) and where each of the spot beams in the image data (binarized data) based on which the distance has been previously obtained has the size of 2×2 (FIG. 11B). In the present example embodiment, when a previously used spot beam SA has the size of 1×1 (FIG. 11A), the reference size is assumed to be the size of 2×2 (SB). That is, when the previously used spot beam SA has the size of 1×1, a spot beam having a size of, e.g., 3×3 is determined to be over the reference size. On the other hand, when a previously used spot beam SC has the size of 2×2 (FIG. 11B), the reference size is, e.g., the size of 3×3 (SD).

Thus, in the present example embodiment, when the previously used spot beam has a size of n×n, a size of (n+1)×(n+1) is set as the reference size. However, the present example embodiment is not limited to this example. For example, when the previously used spot beam has the size of 1×1, the reference size may be the size of 3×3 and, when the previously used spot beam has the size of 3×3, the reference size may be a size of 5×5 or the like.

Subsequently, based on the second specific example when the laser unit 10 is closer to the target object 20, the image processing determination will be described.

(Second Specific Example)

Figure 12:
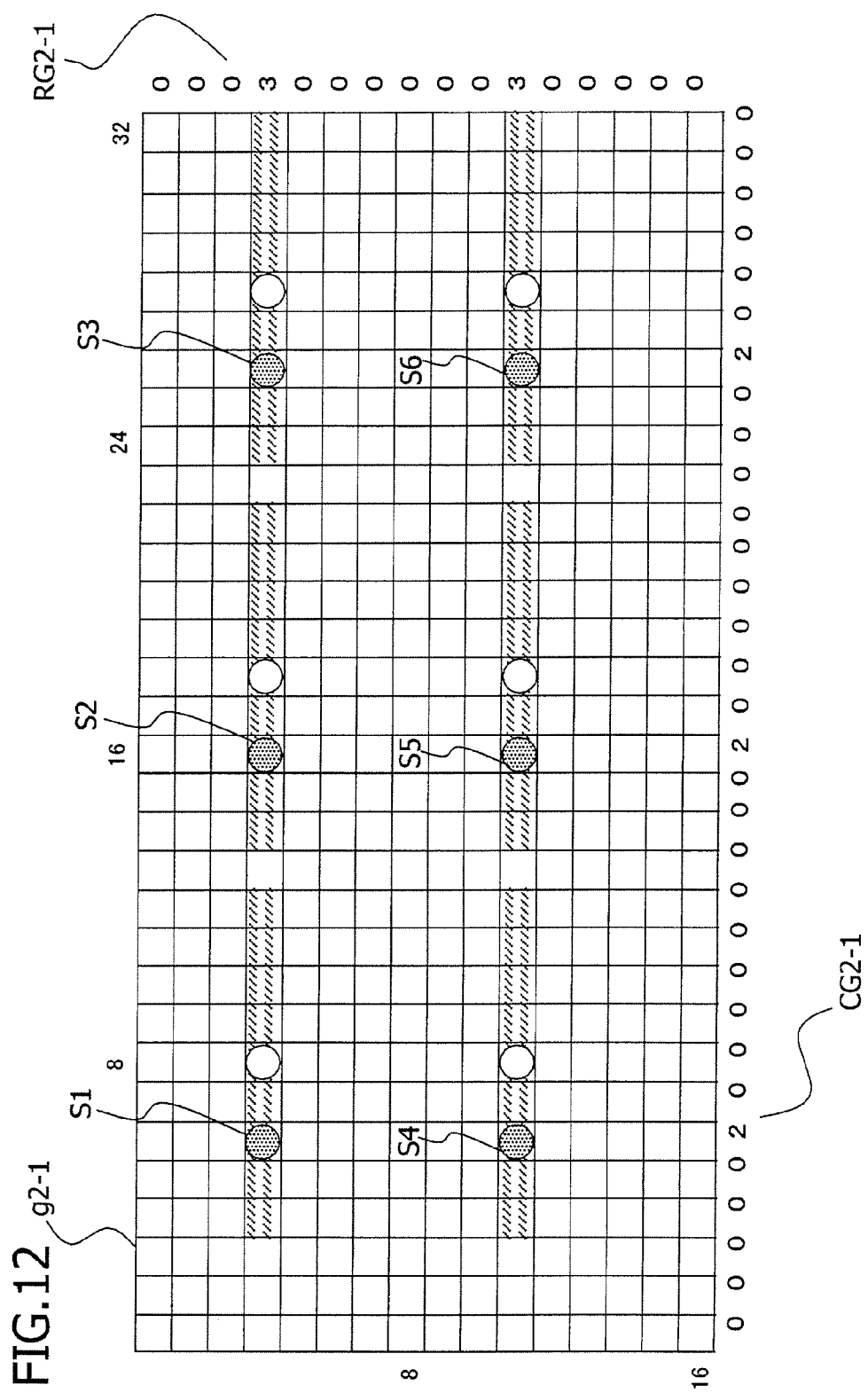
FIG. 12 is a view illustrating image data g2-1, a row-direction graph RG2-1, and a column-direction graph CG2-1 in the second specific example.

FIG. 12 is a view illustrating image data g2-1, a row-direction graph RG2-1, and a column-direction graph CG2-1 in the second specific example. FIG. 12 illustrates the image data g2-1 when the distance to the target object is shorter than the reference distance in comparison to the image data g1-1 in Specific Example 1 of FIG. 10. In the image data g2-1, the solid circles indicate the spot beams S1 to S6 and the hollow circles indicate the spot beams S1 to S6 in the previously used image data g1-1 (FIG. 10). Since the distance to the target object is shorter, the spot beams in the image data g2-1 of FIG. 12 are located leftward of those in the image data g1-1 of FIG. 10.

As described above, in the present example embodiment, the center positions of the spot beams in the column direction in the image data g2-1 do not move from the fourth and eleventh rows. Also, in the image data g2-1 of FIG.

12, each of the spot beams S1 to S6 has the size of 1×1, and therefore the row-direction graph RG2-1 based on the image data g2-1 is the same as the row-direction graph RG1-1 based on the image data g1-1 of FIG. 10. On the other hand, in the image data g2-1 of FIG. 12, in each of the sixth, sixteenth, and twenty-sixth columns, two spot beams are located. Accordingly, the column-direction graph CG2-1 based on the image data g2-1 has the value of 2 in correspondence to each of the sixth, sixteenth, and twenty-sixth columns, while having the value of 0 in correspondence to each of the other columns.

In the row-direction graph RG2-1 of FIG. 12, each of the fourth and eleventh rows has the value of 3 and each of the rows (third and fifth rows/tenth and twelfth rows) previous and subsequent thereto has the value of 0. This allows the distance measurement apparatus 100 to assume that each of the three spot beams S1 to S6 has the size of 1×1 based on the row-direction graph RG2-1. As a result, it is determined that the size of 1×1 of each of the spot beams S1 to S6 is not larger than the reference size 2×2. On the other hand, in the column-direction graph CG2-1 of FIG. 12, the sixth, sixteenth, and twenty-sixth columns having values larger than the value of 0 are each included in the reference distance measurement processing range corresponding to the spot beams. This allows the distance measurement apparatus 100 to determine that none of the spot beams S1 to S6 in the image data g2-1 is at a position which indicates a short distance outside the reference distance measurement processing range based on the column-direction graph CG2-1.

As a result, based on the image data g2-1 of FIG. 12, it is determined that the size of each of the spot beams S1 to S6 in the image data g2-1 is not larger than the reference size and the size of each of the spot beams is normal.

As a result, the control of the value of the output laser light or the shutter speed is not performed. It is also determined that none of the spot beams in the image data g2-1 is at a position which indicates a short distance outside the reference distance measurement processing range and the position of each of the spot beams is normal. Accordingly, the amount of the laser light also need not be adjusted so that the control of the diameter of the output laser light or the shutter speed is not performed.

Subsequently, a specific example when the distance to the target object 20 is shorter than in the image data g2-1 will be illustrated as the third specific example.

(Third Specific Example)

Figure 13:
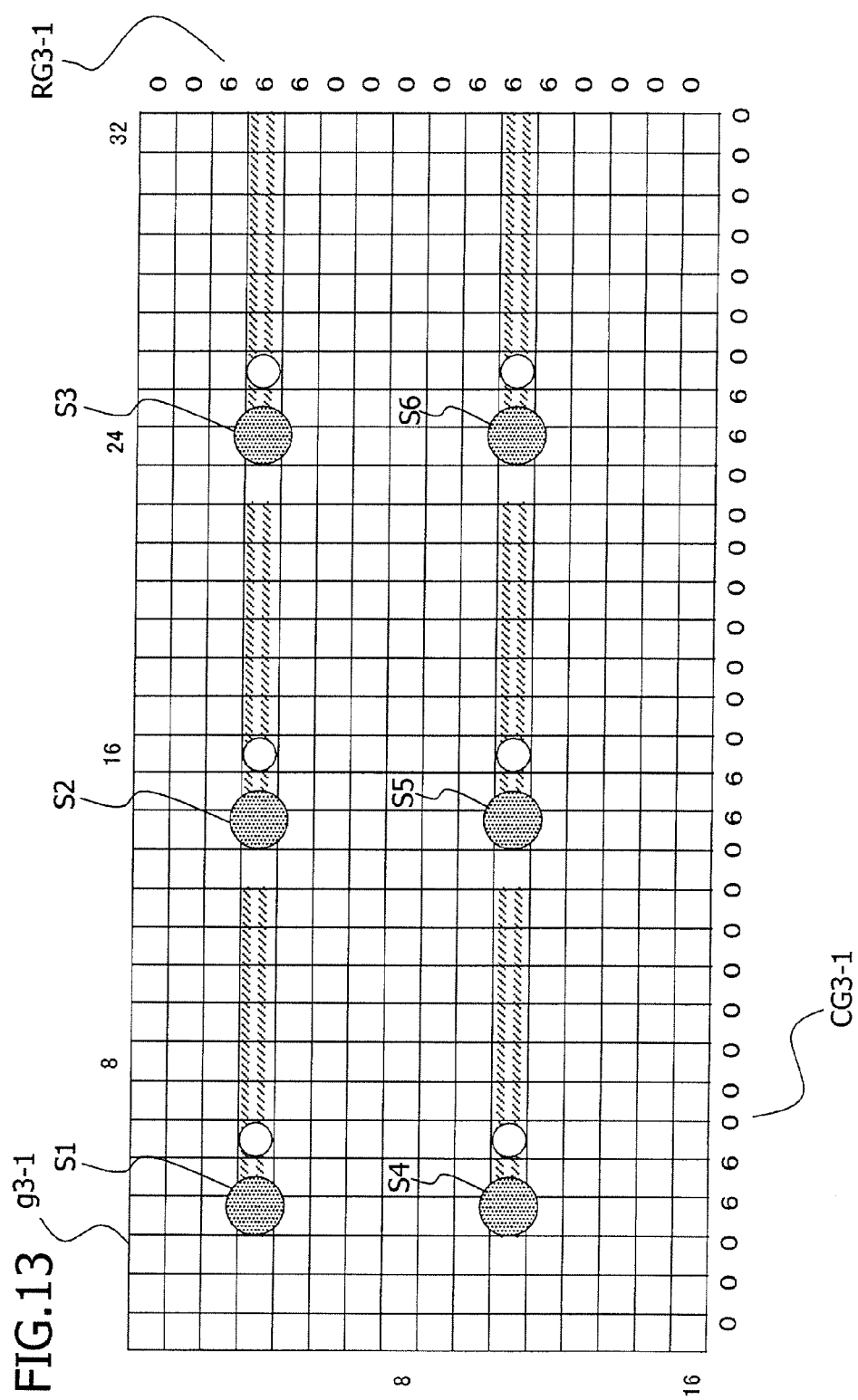
FIG. 13 is a view illustrating image data g3-1, a row-direction graph RG3-1, and a column-direction graph CG3-1 in the third specific example.

FIG. 13 is a view illustrating image data g3-1, a row-direction graph RG3-1, and a column-direction graph CG3-1 in the third specific example. In the image data g3-1 of FIG. 13, the solid circles indicate the spot beams S1 to S6 and the hollow circles indicate the spot beams in the previously used image data g2-1 (FIG. 12). The image data g3-1 of FIG. 13 indicates image data when the distance to the target object is shorter than in the image data g2-1 of FIG. 12. Due to the shorter distance to the target object, in the image data g3-1, each of the adjacent pixels is also detected as a pixel corresponding to the spot beam. Accordingly, each of the spot beams in the image data g3-1 has a size larger than that in the image data g2-1 of FIG. 12.

In the image data g3-1 of FIG. 13, each of the three spot beams (S1 to S3/S4 to S6) extends over two pixels in the third to fifth rows and in the tenth to twelfth rows. Accordingly, the row-direction graph RG3-1 based on the image data g3-1 has a value of 6 in correspondence to each of the third to fifth rows and the tenth to twelfth rows, while having the value of 0 in correspondence to each of the other rows. Also, in the image data g3-1, each of the two spot beams (S1 and S4/S2 and S5/S3 and 6) extends over two pixels in the fourth and fifth columns, in the fourteenth and fifteenth columns, and in the twenty-fourth and twenty-fifth columns. Accordingly, the column-direction graph CG3-1 based on the image data g3-1 has the value of 6 in correspondence to each of the fourth, fifth, fourteenth, fifteenth, twenty-fourth, and twenty-fifth columns, while having a value of 0 in correspondence to each of the other columns.

In the row-direction graph RG3-1 of FIG. 13, each of the third to fifth rows and tenth to twelfth rows has the value of 6 and corresponds to the three spot beams. Therefore, it is assumed that each of the spot beams has a size of about 3×3. In this example, the reference size based on the size of each of the spot beams in the previously used image data g2-1 is a size of 2×2. As a result, it is determined that the size of each of the spot beams S1 to S6 is over the reference size and the size of each of the spot beams is abnormal. Note that, in the column-direction graph CG3-1 of FIG. 13, the fourth, fifth, fourteenth, fifteenth, twenty-fourth, and twenty-fifth columns having values larger than the value of 0 are included in the reference distance measurement processing range corresponding to the spot beams. That is, according to the column-direction graph CG3-1, none of the spot beams in the image data g3-1 is at a position which indicates a short distance outside the reference distance measurement processing range. However, since the size of each of the spot beams is over the reference size, the diameter of the output laser light or the shutter speed is controlled. For example, when the shutter speed has not reached the maximum speed, the shutter speed is controlled to a one-level higher speed (e.g., from 1/30 seconds to 1/60 seconds).

Figure 14:
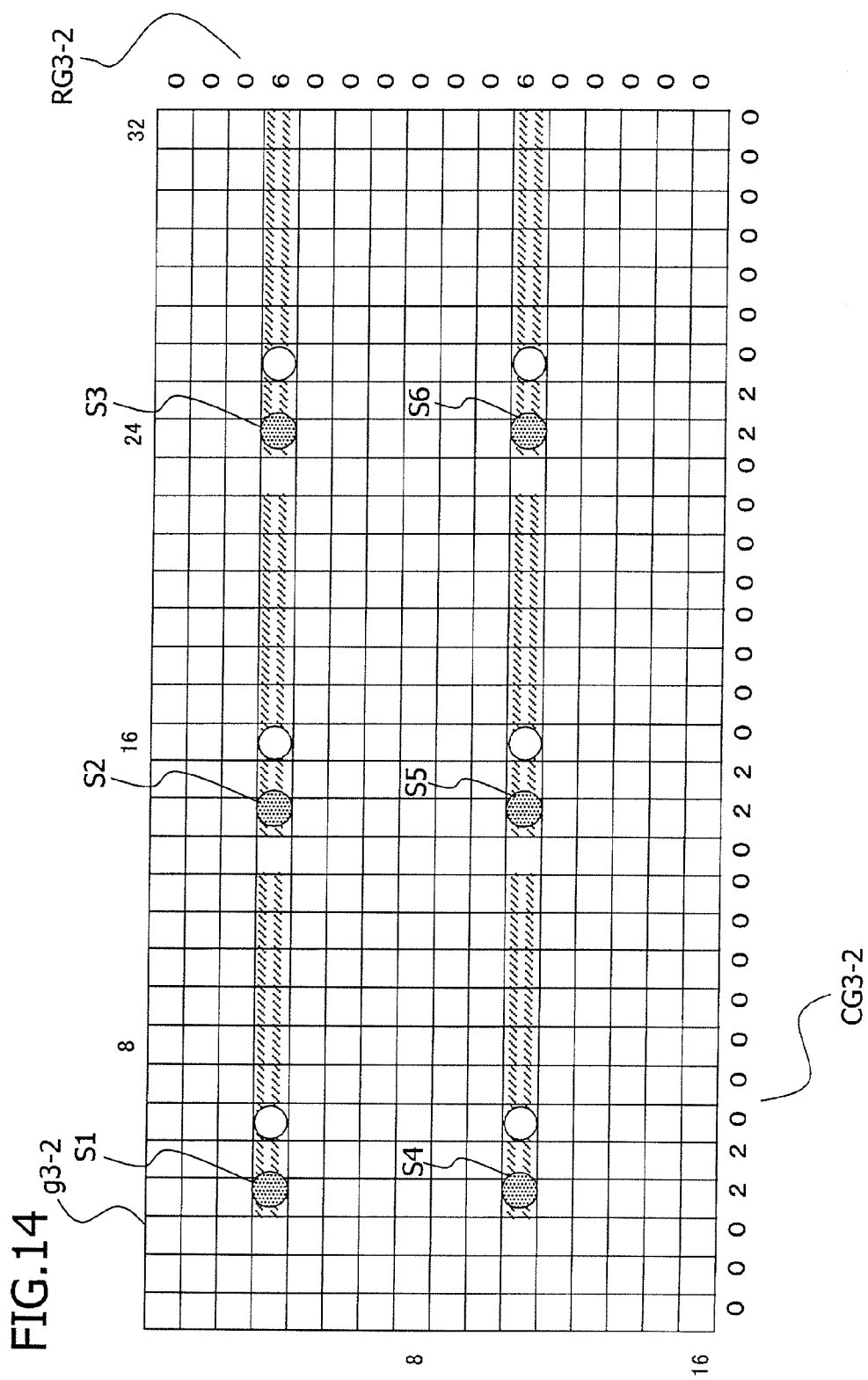
FIG. 14 is a view illustrating image data g3-2, a row-direction graph RG3-2, and a column-direction graph CG3-2 when the shutter speed is controlled based on the image data g3-1 of FIG. 13 in the third specific example.

FIG. 14 is a view illustrating image data g3-2, a row-direction graph RG3-2, and a column-direction graph CG3-2 when the shutter speed is controlled based on the image data g3-1 of FIG. 13 in the third specific example.

The row-direction graph RG3-2 based on the image data g3-2 of FIG. 14 has the value of 6 in correspondence to each of the fourth and eleventh rows, while having the value of 0 in correspondence to each of the other rows. On the other hand, the column-direction graph CG3-2 based on the image data g3-2 has the value of 2 in correspondence to each of the fourth, fifth, fourteenth, fifteenth, twenty-fourth, and twenty-fifth columns, while having the value of 0 in correspondence to each of the other columns. In the row-direction graph RG3-2, each of the rows previous and subsequent to the fourth and eleventh rows has a value of 0. Therefore, it can be assumed that each of the spot beams in the image data g3-2 of FIG. 14 has the size of 1×1. This indicates that, as a result of controlling the shutter speed, the size of each of the spot beams in the image data g3-2 has been reduced. On the other hand, in the column-direction graph CG3-2, each of the fourth, fifth, fourteenth, fifteenth, twenty-fourth, and twenty-fifth columns having values larger than the value of 0 is included in the reference distance measurement processing range of the corresponding spot beam. That is, according to the column-direction graph CG3-2, none of the spot beams in the image data g3-2 is at a position which indicates a short distance outside the reference distance measurement processing range. As a result, based on the image data g3-2 of FIG. 14, the control of the diameter of the output laser light or the shutter speed is not performed.

Thus, by controlling the diameter of the output laser light or the shutter speed based on the image data g3-2, an increase in the size of each of the spot beams in the image data g3-2 is avoided. As a result, even when the distance to the target object is short and the space between the individual spot beams in the image data g3-2 is narrow, the distance measurement apparatus 100 maintains the spot beam in a small size to thereby allow the space between the spot beams to be widened. This allows the distance measurement apparatus 100 to increase the allowable amount of movement of each of the spot beams in the image data g3-2 and widen the distance measurement range.

Subsequently, a specific example in the case where the distance to the target object is shorter than in the image data g3-2 of FIG. 14 will be illustrated as the fourth specific example.

(Fourth Specific Example)

Figure 15:
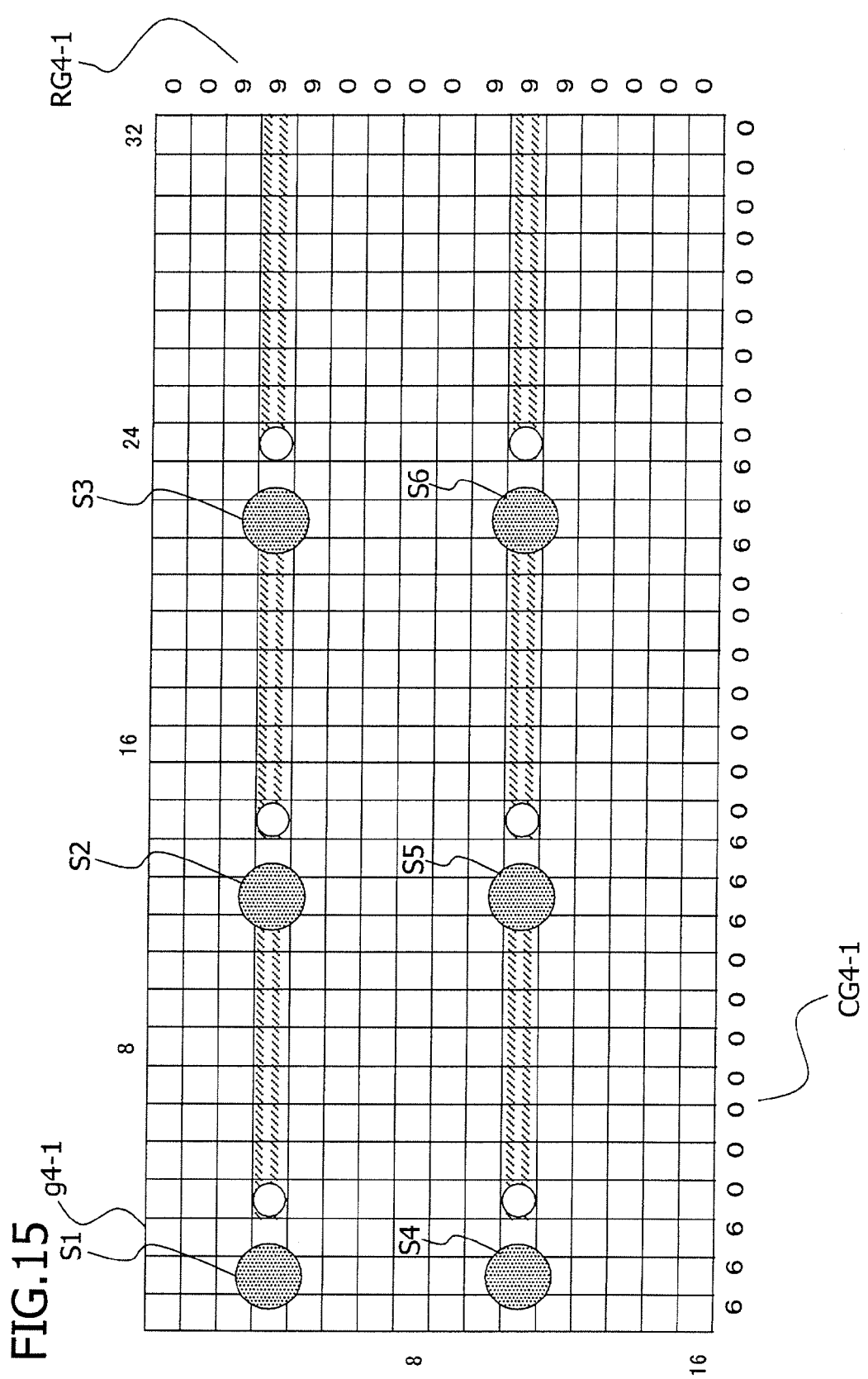
FIG. 15 is a view illustrating image data g4-1, a row-direction graph RG4-1, and a column-direction graph CG4-1 in the fourth specific example.

FIG. 15 is a view illustrating image data g4-1, a row-direction graph RG4-1, and a column-direction graph CG4-1 in the fourth specific example. In the image data g4-1 of FIG. 15, the solid circles indicate the spot beams S1 to S6 and the hollow circles indicate the spot beams S1 to S6 in the previously used image data g3-2 (FIG. 14). The image data g4-1 of FIG. 15 indicates image data when the distance to the target object is shorter than in the image data g3-2 of FIG. 14. Accordingly, the spot beams in the image data g4-1 are located further leftward of and have larger sizes than those in the image data g3-2 of FIG. 14.

In the image data g4-1 of FIG. 15, each of the three spot beams (S1 to S3/S4 to S6) extends over three pixels in the third to fifth rows and in the tenth to twelfth rows. Accordingly, the row-direction graph RG4-1 based on the image data g4-1 has a value of 9 in correspondence to each of the third to fifth rows and the tenth to twelfth rows, while having the value of 0 in correspondence to each of the other rows. Also in the image data g4-1, each of the two spot beams (S1 and S4/S2 and S5/S3 and S6) extends over three pixels in the first to third columns, in the eleventh to thirteenth columns, and in the twenty-first to twenty-third columns. Accordingly, the column-direction graph CG4-1 based on the image data g4-1 has the value of 6 in correspondence to each of the first to third columns, the eleventh to thirteenth columns, and the twenty-first to twenty-third columns, while having the value of 0 in correspondence to each of the other columns.

In the row-direction graph RG4-1 of FIG. 15, each of the third to fifth rows and the tenth to twelfth rows has the value of 9 and corresponds to the three spot beams (S1 to S3/S4 to S6). Therefore, it can be assumed that each of the spot beams has a size of about 3×3. In this example, the reference size based on the size of 1×1 in the previously used image data g3-2 (FIG. 14) is the size of 2×2. Accordingly, the size of each of the spot beams S1 to S6 is over the reference size and determined to be abnormal. On the other hand, in the column-direction graph CG4-1 of FIG. 15, each of the first to third columns, the eleventh to thirteenth columns, and the twenty-first to twenty-third columns having values larger than the value of 0 is at a position which indicates a short distance outside the reference distance measurement processing range corresponding to each of the spot beams. That is, based on the column-direction graph CG4-1, it is determined that the positions of the spot beams S1 to S6 in the image data g4-1 are abnormal. As a result, to prevent an increase in the size of each of the spot beams and reduce the amount of the laser light, the control of the diameter of the output laser light or the shutter speed is performed. For example, when the shutter speed has not reached the maximum speed, the shutter speed is further controlled to a one-level higher speed (e.g., from 1/60 seconds to 1/125 seconds).

Figure 16:
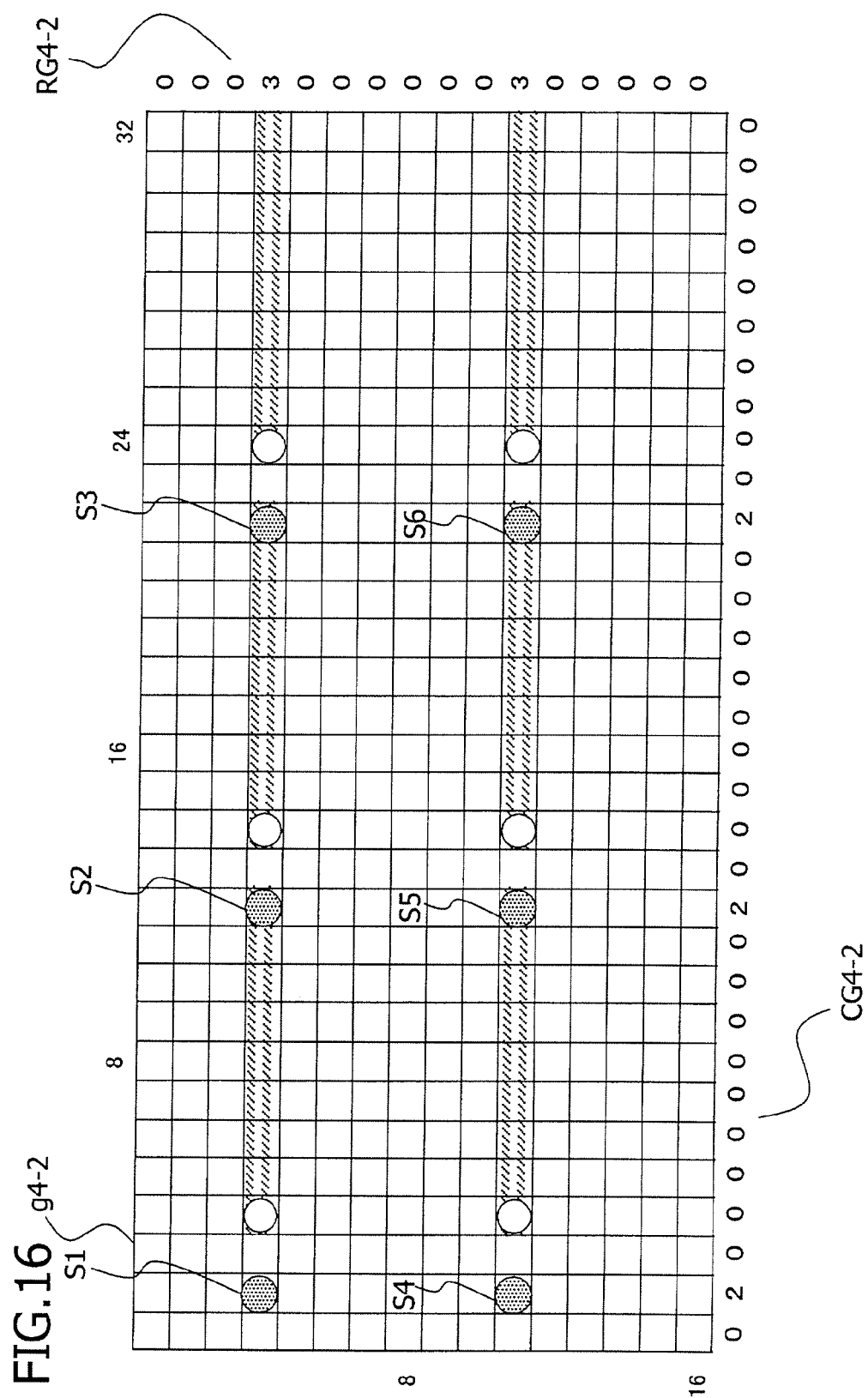
FIG. 16 is a view illustrating image data g4-2, a row-direction graph RG4-2, and a column-direction graph CG4-2 when the shutter speed is controlled based on the image data g4-1 of FIG. 15 in the fourth specific example.

FIG. 16 is a view illustrating image data g4-2, a row-direction graph RG4-2, and a column-direction graph CG4-2 when the shutter speed is controlled based on the image data g4-1 of FIG. 15 in the fourth specific example.

The row-direction graph RG4-2 based on the image data g4-2 of FIG. 16 has the value of 3 in correspondence to each of the fourth and eleventh rows, while having the value of 0 in correspondence to each of the other rows. On the other hand, the column-direction graph CG4-2 based on the image data g4-2 has the value of 2 in correspondence to each of the second, twelfth, and twenty-second columns, while having the value of 0 in correspondence to each of the other columns. In the row-direction graph RG4-2, each of the rows previous and subsequent to the fourth and eleventh rows has the value of 0. Therefore, it can be assumed that each of the spot beams in the image data g4-2 of FIG. 16 has the size of 1×1. This indicates that, as a result of controlling the shutter speed, the size of each of the spot beams is reduced. On the other hand, in the column-direction graph CG4-2, each of the second, twelfth, and twenty-second columns having values larger than the value of 0 is at a position which indicates a short distance outside the reference distance measurement processing range. As a result, the positions of the spot beams are determined to be abnormal and, to further reduce the amount of the laser light, the control of the diameter of the output laser light or the shutter speed is performed.

At this time, when, e.g., the shutter speed has not reached the maximum speed yet, the shutter speed is further controlled to a one-level higher speed (e.g., from 1/125 seconds to 1/500 seconds). For example, when the shutter speed has reached the maximum speed (1/1000), the diameter of the output laser light is controlled to a one-level smaller value (e.g., from 3 mm to 1.5 mm).

Thus, by controlling both or either one of the diameter of the output laser light and the shutter speed based on the image data g4-2, the size of each of the spot beams in the image data g4-2 is reduced and also the amount of the laser light is reduced. This allows the distance measurement apparatus 100 to increase the allowable amount of movement of each of the spot beams in the image data g4-2 and widen the distance measurement range. In addition, by reducing the amount of the laser light, the distance measurement apparatus 100 can reduce the degree of harmfulness of the laser light in such a case where the target object is a person or the like and substantially widen the distance measurement range.

Subsequently, a specific example in the case where the sizes and positions of spot beams in image data are not uniform will be illustrated as the fifth specific example.

(Fifth Specific Example)

FIG. 17 is a view illustrating image data g5-1, a row-direction graph RG5-1, and a column-direction graph CG5-1 in the fifth specific example. In the image data g5-1 of FIG. 17, the solid circles indicate the spot beams S1 to S6 and the hollow circles indicate the spot beams in the image data g1-1 when the target object is located at the reference distance (FIG. 10 of Specific Example 1). In the image data g5-1 of FIG. 17, the sizes and positions of the spot beams are not uniform. For example, the image data g5-1 indicates image data g5-1 in such a case where the shape of the target object is not flat or where the laser light irradiates a plurality of the target objects.

The row-direction graph RG5-1 based on the image data g5-1 of FIG. 17 has the value of 6 in correspondence to each of the third and fifth rows, a value of 7 in correspondence to the fourth row, a value of 5 in correspondence to each of the tenth and twelfth rows, and the value of 6 in correspondence to the eleventh row. On the other hand, the column-direction graph CG5-1 based on the image data g5-1 has the value of 3 in correspondence to each of the fifth and sixth columns, a value of 4 in correspondence to the third and seventh columns, the value of 3 in correspondence to the thirteenth and sixteenth columns, the value of 6 in correspondence to each of the fourteenth and fifteenth columns, the value of 3 in correspondence to each of the twenty-fifth and twenty-sixth columns, and the value of 1 in correspondence to the twenty-seventh column.

According to the row-direction graph RG5-1, each of the fourth and eleventh rows is not over the value of 9 and each of the rows around the third to fifth rows and the tenth to twelfth rows has the value of 0. Therefore, it can be assumed that the maximum size of the spot beams is a size of about 3×3. For example, when the reference size is the size of 2×2, the sizes of the spot beams are determined to be abnormal. In addition, in the column-direction graph CG5-1, none of the individual columns having values larger than the value of 0 is at a position which indicates a short distance outside the reference distance measurement processing range corresponding to each of the spot beams so that the positions of the spot beams are determined to be normal. However, since the maximum size of the spot beams S1 to S6 is over the reference size, the control of the diameter of the output laser light or the shutter speed is performed. Likewise, the value of either of the shutter speed and the laser light is controlled to a smaller value. Note that the values of both of the shutter speed and the laser light can also be controlled to smaller values.

FIG. 18 is a view illustrating image data g5-2, a row-direction graph RG5-2, and a column-direction graph CG5-2 when the diameter of the output laser light or the shutter speed is controlled based on the image data g5-1 of FIG. 17 in the fifth specific example.

The row-direction graph RG5-2 based on the image data g5-2 of FIG. 18 has the value of 4 in correspondence to each of the third and fifth rows, the value of 5 in correspondence to the fourth row, the value of 4 in correspondence to each of the tenth and twelfth rows, and the value of 5 in correspondence to each of the eleventh row. In the row-direction graph RG5-2, the three spot beams S1 to S3 are located in the row direction. Therefore, it can be assumed that the largest one of the spot beams S1 to S3 has the size of 2×2. Also, in the row-direction graph RG5-2, the three spot beams S4 to S6 are located in the row direction. Therefore, it can be assumed that the largest one of the spot beams S4 to S6 has the size of 2×2. This indicates that, as a result of controlling the diameter of the output laser light or the shutter speed, the sizes of the spot beams in the previously used image data g5-1 are reduced. On the other hand, in the column-direction graph CG5-2, none of the individual columns having values larger than the value of 0 is at a position which indicates a short distance outside the reference distance measurement processing range corresponding to each of the spot beams so that the positions of the spot beams are determined to be normal.

Thus, even when the sizes and positions of the spot beams in the image data g5-2 are not uniform, the sizes of the spot beams can be assumed based on the row-direction graph RG5-2 and the column-direction graph CG5-2. As a result, when the sizes of the spot beams are over the reference size, the distance measurement apparatus 100 controls both or either one of the diameter of the output laser light and the shutter speed to allow reductions in the sizes of the spot beams. This allows the distance measurement apparatus 100 to increase the allowable amount of movement of each of the spot beams in the image data even when the distance to the target object is short and widen the distance measurement range.

Thus, the distance measurement apparatus 100 in the present example embodiment has a distance measurement unit (distance measurement processing unit 31) which obtains the distance to the target object based on the positions of the plurality of spot beams in the image data, and a control unit (control processing unit 32). When the size of each of the spot beams is larger than the reference size, the control unit performs, based on the image data, either one or both of a first control operation of reducing the diameter of the laser light output from the laser device, and a second control operation of increasing the shutter speed of the image sensing device 14 that has generated the image data.

Thus, the distance measurement apparatus 100 in the present example embodiment detects the size of each of the spot beams based on the image data and controls the shutter speed of the image sensing device or the diameter of the output laser light to thereby reduce the size of the spot beam. As a result, even when the target object is located in the vicinity of the laser unit 10, the distance measurement apparatus 100 can increase the space between the spot beams in the image data and widen the distance measurement range. The widened distance measurement range prevents the spot beams from being fused together or overlapping each other in the image data and prevents a situation in which the distance to the target object is unable to be measured. Thus, the distance measurement apparatus 100 controls the shutter speed of the image sensing device or the diameter of the output laser light based on the image data to thereby widen the distance measurement range and prevent the situation in which the distance to the target object is unable to be measured in advance. As a result, in the vicinity of the target object, the distance to the target object located at a distance in a wider range can be measured to increase the usability of the distance measurement apparatus 100 in image processing.

In the distance measurement apparatus 100 in the present example embodiment, the control unit binarizes the image data to generate the binarized data, which individual pixels corresponding to the spot beams have the first value and individual pixels not corresponding to the spot beams have the second value different from the first value, and sums up the values of individual pixels in a first direction in the binarized data in which the position of each of the spot beams moves in accordance with a change in the distance to the target object to generate first-direction data. Then, based on the first-direction data, the control unit determines whether or not the size of each of the spot beams is not larger than the reference size.

As a result, based on a graph representing the sum of the values of the pixels in a direction (which is the row direction in this example) in the binarized data of the image data which is orthogonal to a direction (which is the column direction in this example) in which the center position of the spot beam does not move in correspondence to the distance to the target object, the distance measurement apparatus 100 in the present example embodiment can easily assume the maximum size of the spot beam. This allows the distance measurement apparatus 100 to easily determine whether or not the maximum size of the spot beams is not larger than the reference size and efficiently widen the distance measurement range at low cost.

In the distance measurement apparatus 100 in the present example embodiment, the control unit further sums up the values of individual pixels in a second direction in the binarized data which is orthogonal to the first direction to generate second-direction data. Then, based on the position of each of the spot beams assumed based on the second-direction data, the control unit determines whether or not the size of the spot beam is not larger than the reference size.

As a result, based on a graph which allows detection of the sum of the values of the pixels in the direction (which is the column direction in this example) in the binarized data of the image data which is orthogonal to the direction (which is the row direction in this example) in which the center position of the spot beam moves in correspondence to the distance to the target object, the distance measurement apparatus 100 in the present example embodiment can easily assume the position of each of the spot beams and a change in the position thereof. This further allows the distance measurement apparatus 100 to more effectively determine whether or not the size of each of the spot beams is not larger than the reference size based on the assumed position of the spot beam. As a result, the distance measurement apparatus 100 can efficiently widen the distance measurement range.

In the distance measurement apparatus 100 in the present example embodiment, the reference size is a size obtained by increasing, by a reference degree, the size of each of the spot beams in the image data based on which the distance has been previously obtained. This allows the distance measurement apparatus 100 to easily determine an increase in the size of the spot beam and prevent the increase in the size of the spot beam.

In the distance measurement apparatus 100 in the present example embodiment, when each of the spot beams is at a position which indicates a short distance outside a reference distance measurement processing range in the first direction in which the position of the spot beam moves in accordance with a change in the distance to the target object, the control unit performs either one or both of the first and second control operations based on the image data. Thus, not only when the size of each of the spot beams in the image data increases, but also when the amount of the laser light is increased by a reduction in the distance to the target object, the distance measurement apparatus 100 adjusts the shutter speed or the diameter of the output laser light to thereby reduce the amount of the laser light. This can reduce the harmfulness of the laser light when the target object is a person or the like. As a result, it is possible to measure the distance to the target located at a distance in a substantially wider range in the vicinity of the target object to widen the distance measurement range.

In the distance measurement apparatus 100 in the present example embodiment, the control unit further sums up the values of individual pixels in the second direction in the binarized data which is orthogonal to the first direction to generate the second-direction data. Then, based on the second-direction data, the control unit determines whether or not the position of each of the spot beams in the first direction is a position which indicates a short distance outside the reference distance measurement processing range.

As a result, based on a graph which allows detection of the sum of the values of the pixels in the direction (which is the column direction in this example) in the binarized data of the image data which is orthogonal to the direction (which is the row direction in this example) in which the center position of each of the spot beams moves in correspondence to the distance to the target object, the distance measurement apparatus 100 in the present example embodiment can easily determine the position of each of the spot beams and a change in the position thereof. This further allows the distance measurement apparatus 100 to easily determine whether or not the amount of the laser light is large due to the excessively short distance to the target object and substantially widen the distance measurement range.

In the distance measurement apparatus 100 in the present example embodiment, the reference distance measurement processing range is a range which does not overlap the reference distance measurement processing range of the adjacent spot beam. This allows the distance measurement apparatus to avoid a situation in which, since the spot beam in the image data is fused with the adjacent spot beam and the amount of movement of the spot beam is unable to be measured, the distance to the target is unable to be measured.

Note that, in the present example embodiment, an exemplary case has been illustrated in which the row-direction graph and the column-direction graph are produced, but the present example embodiment is not limited to this example. The first-direction data and the second-direction data need not necessarily be graphically represented. Each of the first-direction data and the second-direction data indicates a set of numerical values.

Note that the distance measurement processing in the present example embodiment may also be stored as a program in a computer readable recording medium and performed by causing a computer to read the program and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A distance measurement apparatus, comprising:
   a laser device having a laser and a diffraction grating mounted in front of the laser, the laser irradiating with laser light to the diffraction grating to project a plurality of spot beams in a grid-like pattern on a target object;
   an image sensor that generates image data of the plurality of spot beams;
   a distance measurement processor that obtains a distance between the laser and the target object based on respective positions of the plurality of spot beams in the image data and on sizes of each of the plurality of spot beams; and
   a controller that reduces a diameter of the laser light output by the laser from a first diameter to a second diameter smaller than the first diameter when a size of each of the spot beams of the image data generated when the laser light is output at the first diameter is larger than a reference size, or increases a shutter speed of the image sensor from a first shutter speed to a second shutter speed faster than the first shutter speed when the size of each of the spot beams of the image data generated at the first shutter speed is larger than the reference size, the reference size being a size obtained by increasing, by a reference degree, the size of each of the spot beams in the image data of which the distance has previously been obtained.

2. The distance measurement apparatus according to claim 1,
   wherein the controller binarizes the image data to generate binarized data, which individual pixels corresponding to the spot beams have a first value and individual pixels not corresponding to the spot beams have a second value different from the first value, and sums up values of the individual pixels in a first direction in the binarized data in which the position of each of the spot beams moves in accordance with a change in the distance to the target object to generate first-direction data, and
   wherein, based on the first direction data, the controller determines whether the size of each of the spot beams is not larger than the reference size.

3. The distance measurement apparatus according to claim 2,
   wherein the controller further sums up values of individual pixels in a second direction in the binarized data that is orthogonal to the first direction to generate second-direction data, and
   wherein, based on the respective position of each of the spot beams assumed based on the second-direction data, the controller determines whether the size of the spot beam is not larger than the reference size.

4. The distance measurement apparatus according to claim 2,
   wherein, when each of the spot beams is not located within a reference distance measurement processing range, which indicates a range of up to a midpoint of an adjacent spot beam, in the first direction in which the position of the spot beam moves in accordance with a change in the distance to the target object, the controller reduces the diameter of the laser light output by the laser or increases the shutter speed of the image sensor.

5. The distance measurement apparatus according to claim 4,
wherein the controller further sums up the values of the individual pixels in the second direction in the binarized data that is orthogonal to the first direction to generate second-direction data, and
wherein, based on the second-direction data, the controller determines whether each of the spot beams in the first direction is not located within the reference distance measurement processing range.

6. The distance measurement apparatus according to claim 4,
wherein the reference distance measurement processing range is a range which does not overlap the reference distance measurement processing range of the adjacent spot beam.

7. The distance measurement apparatus according to claim 1, wherein the laser includes a diffraction grating, and the spot beams are generated from the laser light by the diffraction grating.

8. A distance measurement method, comprising:
irradiating, by a laser with laser light to a diffraction grating mounted in front of the laser to project a plurality of spot beams in a grid-like pattern on a target object;
generating, by an image sensor, image data of the plurality of spot beams;
obtaining a distance between the laser and the target object based on respective positions of the plurality of spot beams in the image data and on sizes of each of the plurality of spot beams; and
reducing a diameter of the laser light output by the laser device from a first diameter to a second diameter smaller than the first diameter when a size of each of the spot beams of the image data generated when the laser light is output at the first diameter is larger than a reference size, or increasing a shutter speed of the image sensor from a first shutter speed to a second shutter speed faster than the first shutter speed when the size of each of the spot beams of the image data generated at the first shutter speed is larger than the reference size, the reference size being a size obtained by increasing, by a reference degree, the size of each of the spot beams in the image data of which the distance has previously been obtained.

9. The distance measurement method according to claim 8, further comprising:
generating binarized data based on the image data to in which individual pixels corresponding to the spot beams have a first value and individual pixels not corresponding to the spot beams have a second value different from the first value;
summing up values of the individual pixels in a first direction in the binarized data in which the position of each of the spot beams moves in accordance with a change in the distance to the target object to generate first-direction data; and
based on the first direction data, determining whether the size of each of the spot beams is not larger than the reference size.

10. The distance measurement method according to claim 9, wherein, when each of the spot beams is not located within a reference distance measurement processing range, which indicates a range of up to a midpoint of an adjacent spot beam, in the first direction in which the position of the spot beam moves in accordance with a change in the distance to the target object, reducing the diameter of the laser light output by the laser or increasing the shutter speed of the image sensor.

11. The distance measurement method according to claim 10, further comprising:
summing up the values of the individual pixels in the second direction in the binarized data that is orthogonal to the first direction to generate second-direction data; and
based on the second-direction data, determining whether each of the spot beams in the first direction is not located within the reference distance measurement processing range.

12. The distance measurement method according to claim 10, wherein the reference distance measurement processing range is a range that does not overlap the reference distance measurement processing range of the adjacent spot beam.

* * * * *